US012713218B1

(12) United States Patent
Stidham

(10) Patent No.: US 12,713,218 B1
(45) Date of Patent: Aug. 18, 2026

(54) PORTABLE ELECTRONIC DEVICE WITH EMERGENCY MODE FOR LOW BATTERY USAGE AND METHOD FOR USING THE SAME

(71) Applicant: Ryan Stidham, Independence, KY (US)

(72) Inventor: Ryan Stidham, Independence, KY (US)

(73) Assignee: Top Tier Technology LLC, Independence, KY (US)

( * ) Notice: Subject to any disclaimer, the term of this patent is extended or adjusted under 35 U.S.C. 154(b) by 0 days.

(21) Appl. No.: 19/389,573

(22) Filed: Nov. 14, 2025

Related U.S. Application Data

(63) Continuation-in-part of application No. 19/186,154, filed on Apr. 22, 2025, now Pat. No. 12,498,778.

(51) Int. Cl.

| | |
|---|---|
| ***H04W 4/90*** | (2018.01) |
| ***H04W 4/14*** | (2009.01) |
| ***H04W 12/06*** | (2021.01) |
| ***H04W 52/02*** | (2009.01) |
| ***H04W 64/00*** | (2009.01) |

(52) U.S. Cl.
CPC ............... *H04W 4/90* (2018.02); *H04W 4/14* (2013.01); *H04W 12/06* (2013.01); *H04W 52/0261* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 5,454,710 A | 10/1995 | Landau et al. | |
| 5,549,984 A | 8/1996 | Dougherty | |
| 6,879,259 B1 | 4/2005 | Smith et al. | |
| 8,862,092 B2 | 10/2014 | Reitnour | |
| 9,430,021 B2 | 8/2016 | Lu et al. | |
| 9,615,333 B2 | 4/2017 | Brown et al. | |
| 10,228,751 B2 | 3/2019 | Andrews et al. | |
| 10,613,608 B2 | 4/2020 | Graham et al. | |
| 12,400,228 B1 * | 8/2025 | Krishnaswamy | G06Q 20/401 |
| 2002/0077159 A1 * | 6/2002 | Jiang | H04W 52/0277 455/574 |
| 2006/0143365 A1 | 6/2006 | Kikuchi | |
| 2007/0004466 A1 | 1/2007 | Haartsen | |
| 2009/0149153 A1 | 6/2009 | Lee | |
| 2011/0230161 A1 | 9/2011 | Newman | |

(Continued)

*Primary Examiner* — Adolf Dsouza
(74) *Attorney, Agent, or Firm* — FBT Gibbons LLP

(57) ABSTRACT

A portable electronic device that maintains a concealed battery reserve exclusively for emergency operations while appearing completely depleted during normal use. When the device's main battery capacity reaches a predetermined threshold, a masking system reports zero percent charge to the operating system, causing the device to shut down regular functions while preserving the hidden reserve. Remote activation capabilities enable trusted contacts to trigger emergency functionality through authenticated signals received via satellite communication, SMS, cloud-based servers, or local wireless connections. Upon successful cryptographic verification and timestamp validation to prevent replay attacks, the system unlocks the concealed reserve and automatically transmits emergency alerts containing location data to designated contacts, ensuring critical communication capabilities remain available when users are unable to manually activate emergency functions.

20 Claims, 17 Drawing Sheets

(56) References Cited

U.S. PATENT DOCUMENTS

2016/0307007 A1 10/2016 Narasimha et al.
2017/0079082 A1* 3/2017 Papay ..................... H04W 4/70
2018/0184360 A1 6/2018 Cavalcanti et al.

* cited by examiner 100
190
MAIN CIRCUIT
180
SWITCH
120
BATTERY
130
BATTERY DETECTOR
$V_0$
195
140
144
142
$S_1$
$S_2$
COM
$V_S$
HOST CONTROLLER
110
200
300
150
DISPLAY UNIT
160
162
KEY INPUT UNIT
170
ALARM GENERATOR
172
174

100
110
MAIN CIRCUIT
SWITCH
COMPARATOR
HOST CONTROLLER
ALARM GENERATOR
MEMORY
MASK
OS
E. OS
195
200
300
BATTERY
120
BATTERY DETECTOR
130
DISPLAY UNIT
150
KEY INPUT UNIT
160
162
172
174

FIG. 4

500
NORMAL FULL POWER STATE
BATTERY DETECTOR
POWER LOW
510
EMERGENCY ONLY= TRUE
520
530
EMERGENCY POWER RESERVE STATE
USER
TURN ON POWER
540
TURN ON POWER
550
DISPLAY USER MESSAGE LIKE "EMERGENCY POWER RESERVE MODE"
560
570
ASK USER WHETHER HE WANTS TO MAKE AN EMERGENCY CALL
YES
NO
TURN OFF POWER
580

700
NORMAL FULL POWER STATE
BATTERY DETECTOR
POWER LOW
710
EMERGENCY ONLY= TRUE
720
730
EMERGENCY POWER RESERVE STATE
USER
TURN ON POWER
740
TURN ON POWER
750
DISPLAY USER MESSAGE LIKE "EMERGENCY POWER RESERVE MODE"
760
770
ASK USER WHETHER HE WANTS TO MAKE AN EMERGENCY CALL
YES
NO
TURN OFF POWER
780
790
DIAL PRESTORED EMERGENCY NUMBER
END

PORTABLE ELECTRONIC DEVICE WITH EMERGENCY MODE FOR LOW BATTERY USAGE AND METHOD FOR USING THE SAME

CROSS-REFERENCE TO RELATED APPLICATIONS

This application is a continuation-in-part of U.S. application Ser. No. 19/186,154, filed on Apr. 22, 2025 and titled "PORTABLE ELECTRONIC DEVICE WITH EMERGENCY MODE FOR LOW BATTERY USAGE AND METHOD FOR USING THE SAME," the disclosure of which is incorporated herein by reference in its entirety.

FIELD OF THE INVENTION

The present invention relates to portable electronic devices such as cellular or mobile telephones which utilize batteries, and more particularly, relates to methods and apparatus for the management of the batteries of such portable electronic devices.

BACKGROUND OF THE INVENTION

Portable electronic devices such as wireless terminal devices, also known as cellular or mobile telephones, are ubiquitous in modern society. Cellular or mobile telephones are becoming more portable and easier to use all the time, and customers (users) are now relying daily on the availability of these cellular or mobile telephones to accommodate their communication needs. These cellular telephones are typically driven by batteries of different battery storage capacities, often based on sizes and battery technologies. Therefore the challenges for these cellular telephones are to manage the battery power efficiently and to extend the battery life as long as possible both in the talk (transmit) mode and standby (idle) mode.

Many advanced wireless systems incorporate battery power management features which not only conserve battery power by minimizing mobile system processing, particularly during the standby mode, but also allow the user to gauge the remaining battery life and alert the user to the run-down of a battery with either an audible alert message or a vibration for subsequent recharge operations Either situation however, when the battery is run-down (dead), the user has no choice but to recharge the battery before usage. For many cellular telephones, the battery may last only 1 to 2 hours of talk time when used in the cellular system. As a result, the user is often left with a useless cellular telephone without any battery power in cases of emergency situations when such a cellular telephone is needed most.

Therefore, there is a strong need for an inexpensive, more effective and efficient avenue to ensure that a portable electronic device such as a cellular telephone is always available for use in cases of emergency, and that the user always has access to such a cellular telephone in cases of emergency regardless of the conditions of its battery.

BRIEF DESCRIPTION OF THE DRAWINGS

FIG. 4 illustrates a system architecture diagram of a portable electronic device, detailing the data flow for battery level monitoring, masking, and emergency operation activation.

FIG. 6 illustrates example displays of a portable electronic device, where

DETAILED DESCRIPTION OF THE INVENTION

Figure 1:
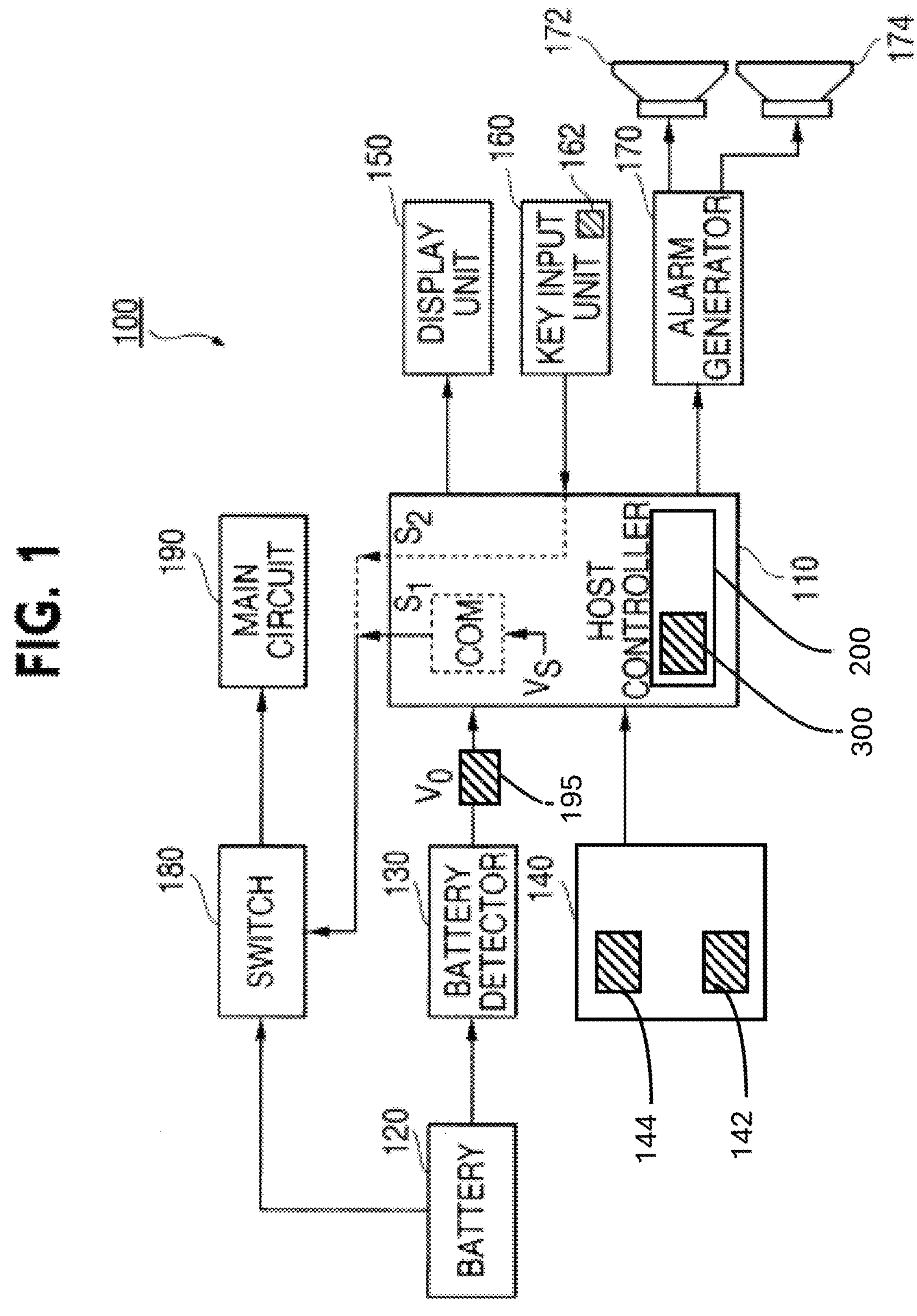
FIG. 1 illustrates a block diagram of a portable electronic device, such as a cellular telephone, with a battery reserve feature for emergency use, showing component interactions.

Various non-limiting embodiments of the present disclosure will now be described to provide an overall understanding of the principles of the structure, function, and use of the systems and methods as disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Components and modules can be implemented in software, hardware, or a combination of software and hardware. The term software is used expansively to include not only executable code, but also data structures, data stores, and computing instructions in any electronic format, firmware, and embedded software. The terms information and data are used expansively and can include a wide variety of electronic information, including but not limited to machine-executable or machine-interpretable instructions; content such as text, video data, and audio data, among others; and various codes or flags. The terms information, data, and content are sometimes used interchangeably when permitted by context.

The examples discussed herein are examples only and are provided to assist in the explanation of the systems and methods described herein. None of the features or components shown in the drawings or discussed below should be taken as mandatory for any specific implementation of any of these systems and methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The present disclosure is applicable for use with all types of portable electronic devices and wireless terminal devices which utilize batteries for data communications. Examples of such portable electronic devices and wireless terminal devices may include both analog and digital mobile or cellular phones, pagers, wireless portable digital assistants (PDAs), and other portable consumer electronics. However, for the sake of simplicity, discussions will concentrate mainly on mobile or cellular phones using batteries, although the scope of the present invention is not limited thereto.

Conventional portable electronic devices often include power-saving modes triggered at low battery levels to extend operational time. However, these modes typically do not reserve energy explicitly for emergency usage nor prevent users from consuming all available power, leaving devices inoperable in critical situations. The present disclosure addresses this limitation by introducing a concealed battery reserve feature, which ensures a portion of battery power remains available exclusively for emergency operations, even when the device appears fully drained.

This masking functionality operates at a low level within the device architecture, intercepting battery status information before the information reaches the main operating system. When the battery level reaches the predetermined reserve threshold, the masking system reports a zero percent charge level to the operating system, causing the device to shut down normal operations and display indicators suggesting complete battery depletion. This masking approach ensures that users cannot inadvertently consume the reserved battery capacity through continued use of regular device functions.

The emergency activation system may operate through local user interaction, where a specific physical interaction such as pressing a designated button sequence triggers access to the reserved battery capacity. Upon activation, an emergency subsystem becomes operational, enabling functions such as placing calls to emergency services, transmitting current location coordinates via GPS, sending predefined distress messages to designated contacts, or activating audible alarms to attract nearby assistance.

In addition to local activation capabilities, the system encompasses remote activation functionality where trusted contacts or external systems can trigger access to the battery reserve through authenticated communication channels. The remote activation system supports multiple communication paths including satellite communication links, encrypted text messaging, cloud-based server requests, and local wireless connections such as Bluetooth or Wi-Fi Direct. Each communication path incorporates authentication mechanisms to verify that activation requests originate from authorized sources.

The authentication system maintains a pre-authorized contact list with unique cryptographic identifiers for each trusted contact. Incoming activation signals undergo verification processes that may include message integrity checking through cryptographic signatures, replay attack protection through timestamp validation, and identity verification against the stored contact list. The multi-layered authentication approach ensures that only legitimate activation requests can trigger access to the reserved battery capacity.

Upon successful authentication of a remote activation signal, the system unlocks the battery reserve and initiates emergency communication protocols. The emergency response may include automatic transmission of location data to designated contacts, sending of predefined emergency messages, establishment of communication links with emergency services, or activation of beacon signals to facilitate location tracking by rescue personnel. The system may continue emergency operations until the reserved battery capacity becomes depleted, maximizing the duration of emergency communication capabilities.

Attention now is directed to the drawings and particularly to FIG. 1, in which a portable electronic device such as a cellular telephone having a battery reserve feature for emergency use according to an embodiment of the present disclosure is illustrated. The battery reserve feature advantageously reserves a portion, for example, 20%, of the battery to be used only for emergency situations, masking the real battery percentage to display 0% when the reserve threshold is reached. This ensures the cellular phone always has sufficient battery power to make emergency calls or perform other emergency operations, even when the battery appears depleted for all other purposes (i.e., regular calls). The emergency numbers include, for example, an emergency 911 number linked to a public 911 emergency system utilized to identify the location of the cellular telephone, and any other pre-stored emergency numbers that the user deems appropriate for emergency use. These emergency numbers may be set or reset by a user from a user menu provided on a display. The battery used in such a cellular telephone may include, for example, Alkaline, Nickel Cadmium (NiCD), Nickel Metal Hydride (NiMH), Lithium Ion (Li-Ion), and Zinc Air. Each of these batteries has a battery storage capacity that varies depending on its size and battery technology. Therefore, the battery reserve feature of such a cellular telephone may require adjustments for low battery indications depending on the battery used.

As shown in FIG. 1, the cellular telephone 100 may comprise a host controller 110, a battery 120, a battery detector 130, a memory 140, a display unit 150, a key input unit 160, an alarm generator 170, a switch 180, a main circuit 190, a masking module 195, a main operating system 200, and an emergency subsystem 300 arranged to control operations of the cellular telephone 100.

Host controller 110 is arranged to interact with the battery detector 130, the memory 140, the display unit 150, the key input unit 160, the alarm generator 170, the switch 180, the main circuit 190, the masking module 195, the main operating system 200, and the emergency subsystem 300, and to support the main circuit 190 in controlling operations of the cellular telephone 100, particularly the battery reserve feature for emergency use according to an embodiment of the present disclosure. The host controller 110 further manages transitions between a normal operating mode and a dedicated emergency mode, preventing access to the reserved battery power during regular operations, enabling access to the reserved battery power for emergency operations, initiating an emergency mode upon user request via a specific interaction, and ensuring that the reserved battery portion is used solely for emergency operations. The host controller 110 is further configured to disable all non-essential device functions while emergency mode is active and prevents the main operating system 200 from accessing the reserved battery capacity during standard operation.

Battery 120, as previously discussed, may be one of an Alkaline, Nickel Cadmium (NiCD), Nickel Metal Hydride (NiMH), Lithium Ion (Li-Ion), or Zinc Air type of battery, and has a battery storage capacity that varies depending on its size and battery technology. Such a battery 120 may be removable from the cellular telephone 100 for either replacement or recharging purposes.

Battery detector 130 is connected to the battery 120 to detect the battery power (e.g., voltage or current) of the battery 120 as a power source of the cellular telephone 100 and produce battery power information Vd indicating the detected real-time battery level in either an analog or digital form.

Memory 140 may contain a program storage area 142 and a data storage area 144. The program storage area 142 may include a Read-Only-Memory (ROM) for storing software for the main operating system 200 and application software including the battery reserve feature for emergency use according to an embodiment of the present disclosure. The data storage area 144 may include a Random-Access-Memory (RAM), implemented as a non-transitory memory, which serves as a working memory for storing relevant data, including power (e.g., voltage or current) setting information VS, also referred to as a predefined reserve threshold, for designating a battery power value at which an alarm is given, informing that the battery power information Vd indicating the detected real-time battery level approaches the lowest usable voltage or current (e.g., 20% of the battery power) of the battery 120. The non-transitory memory is further configured to store a set of preconfigured emergency contacts, such as telephone numbers for emergency services or user-designated contacts, accessible only during the emergency mode to ensure secure and prioritized communication. Such power setting information VS serves as a reference for the battery power information Vd and may be set and varied by the user via the key input unit 160. In an alternative embodiment, the power setting VS may be preset by a third party, such as a service provider, or by the manufacturer, to ensure a standardized emergency reserve tailored to the device's specifications or regional requirements, and stored in the memory 140 as a fixed value inaccessible to user modification. Additionally, the power setting VS may be updated remotely by a third party, including those designated as emergency contacts, via secure network communication to adjust the reserve threshold based on specific needs or conditions, such as increased emergency requirements in high-risk scenarios. Furthermore, in another embodiment, the power setting VS may dynamically fluctuate based on usage patterns or external conditions, such as environmental factors like temperature or weather, which can affect expected battery life, requiring an increase in VS to ensure sufficient power remains for emergency operations; additionally, VS may adjust upward if the user is in a dangerous or remote area, as determined by GPS or network data, where emergency operations are more critical or require greater lead time to be effective. The memory 140 may also be permanently incorporated into the host controller 110.

Display unit 150 may be a Liquid Crystal Display (LCD) for providing a visual display of visible information such as letters, symbols, or the like necessary for the user to operate the cellular telephone 100, including using the battery reserve feature for emergency use according to an embodiment of the present disclosure. When the battery power information Vd reaches the power setting VS, the display unit 150 is configured to show a "no power" message or a blank screen, misleading the user into believing the phone is completely dead, while in reality, it retains sufficient power for emergency calls or other emergency operations, thereby safeguarding this reserve from unnecessary use.

The masking module 195 is configured to interface between the battery detector 130 and the main operating system 200, transmitting a modified battery level value to the main operating system 200 when the battery power information Vd reaches the power setting VS, such that the main operating system 200 receives a masked battery value indicating full depletion, prompting a shutdown or inoperable state for regular functions. The masking operation may be performed at the firmware or bootloader level, independent of the main operating system 200, to ensure robustness and security of the reserve.

Key input unit 160 may include a number of keys corresponding to alphabets/numbers for the user to input relevant data, and other well-known function keys. This unit enables the user to interact with the cellular telephone 100, including setting emergency numbers and power thresholds (where permitted), and initiating emergency calls or operations when the battery power reaches the reserve level. A specific physical interaction, such as pressing a designated button, may activate the emergency subsystem 300, triggering an emergency mode.

Alarm generator 170 may include a speaker 172 and a buzzer 174 for sounding an alarm or a vibration to alert the user of low battery power when the battery power information Vd indicating the detected power value from the battery detector 130 approaches the power setting information VS of the battery 120.

Switch 180 is arranged to operate to either permit or stop the feed of battery power from the battery 120 to the main circuit 190 of the cellular telephone 100, upon receipt of a switch control signal S1 from the host controller 110 or a switch control signal S2 from the key input unit 160, via the host controller 110.

The main circuit 190 includes the emergency subsystem 300, which may operate under a micro-OS or firmware independent of the main operating system 200. The emergency subsystem 300 enables basic emergency operations, including initiating an emergency call to a preconfigured contact (e.g., 911), sending current GPS location to designated emergency contacts, taking a screenshot of the phone display (e.g., to capture critical information), sending a pre-recorded distress message, activating a loud alarm through the speaker 172 to attract attention from nearby individuals in a crisis, or launching a low-power communication protocol for emergency alerts, allowing access to emergency functionalities using the reserved battery capacity.

The main operating system 200 manages regular operations of the cellular telephone 100, including user interface functions, application execution, and communication protocols during normal mode. When the masking module 195 signals a 0% battery level, the main operating system 200 shuts down or disables non-essential functions, preserving the reserved battery power for the emergency subsystem 300.

The host controller 110 may include a comparator 112 arranged to make a comparison between the battery power information Vd indicating the detected power value from the battery detector 130 and the power setting information VS set by the user (or a third party/manufacturer, or dynamically adjusted in the alternative embodiments), and generate a low battery indication signal when the battery power information Vd reaches the power setting VS. Then the alarm generator 170 may, in response to the low battery indication signal, alert the user of such a low battery indication by either blipping, via the speaker 172, or a number of vibrations, via the buzzer 174.

The display unit 150 and the key input unit 160 may also serve as input/output means for various types of information associated with call originating and call incoming, which are functions inherent in the cellular telephone. The construction and function of the other components of the cellular telephone are feasible using well-known techniques, and hence, the explanation thereof will be omitted.

Figure 2:
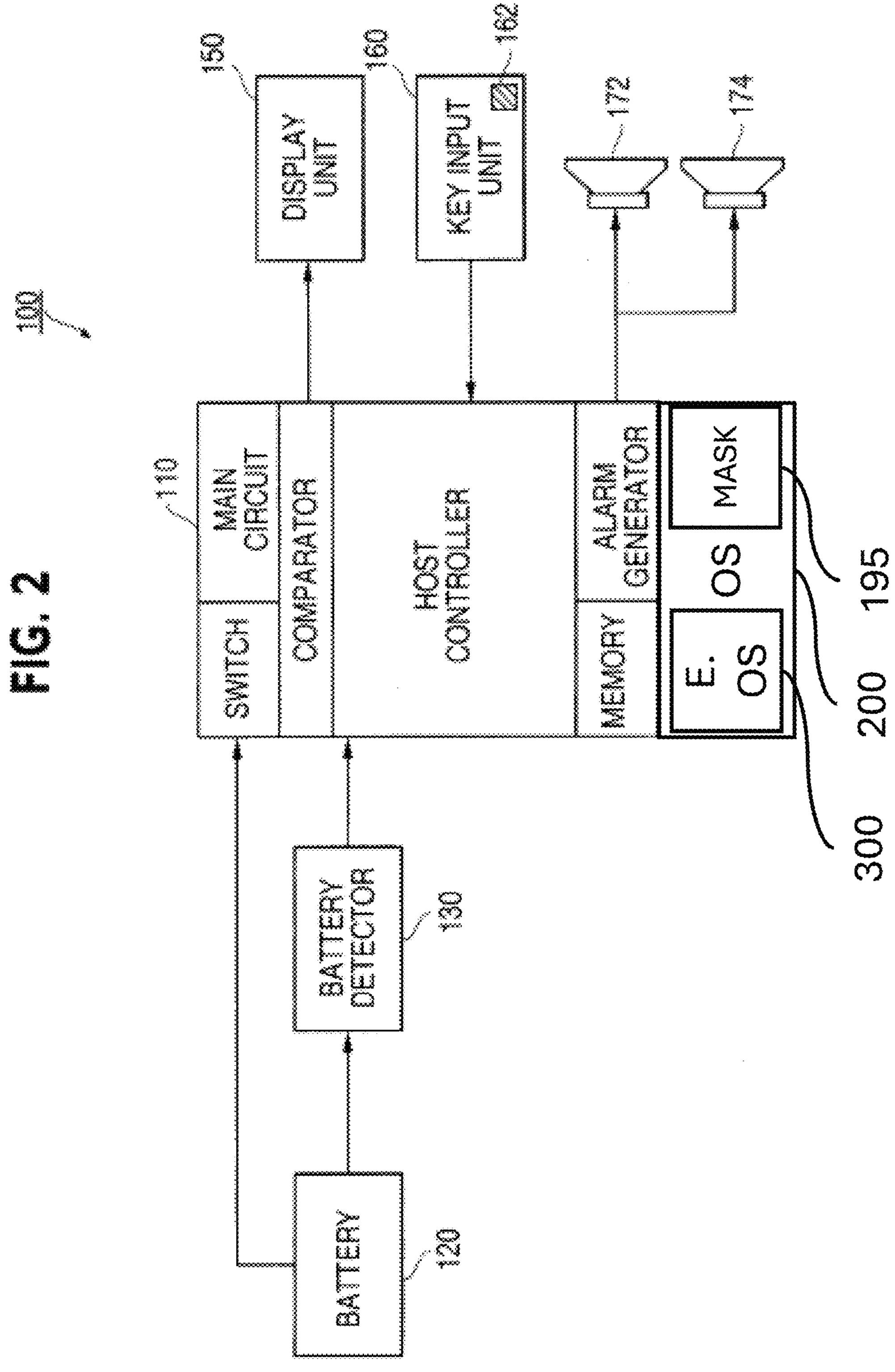
FIG. 2 depicts an alternative block diagram of a portable electronic device with integrated components for the battery reserve feature, emphasizing host controller functionality.

FIG. 2 illustrates an example block diagram of a portable electronic device such as a cellular telephone having the battery reserve feature for emergency use according to another embodiment of the present disclosure. As shown in FIG. 2, the memory 140, the alarm generator 170, the switch 180, the main circuit 190, the masking module 195, the main operating system 200, and the emergency subsystem 300 may be integrated into the host controller 110 such that the host controller 110 is now configured to control all operations of the cellular telephone 100, including the use of the battery reserve feature for emergency use according to an embodiment of the present disclosure. For example, application software written specifically for controlling the power supply from the battery 120, including the use of the battery reserve feature, may be downloaded into the main operating system 200 of the host controller 110 via the Internet or from a tangible medium, such as a floppy disk or a compact disk (CD) ROM, or may also be bundled with the main operating system 200 which may be activated by first battery power. Additionally, the application software may receive over-the-air (OTA) patches to update the battery reserve feature, ensuring compatibility with evolving network standards and enhancing functionality through secure wireless updates. Alternatively, the application software may also be available as a firmware module or a comprehensive hardware/software module which may be built into the host controller 110 to control all operations of the cellular telephone 100.

Figure 3:
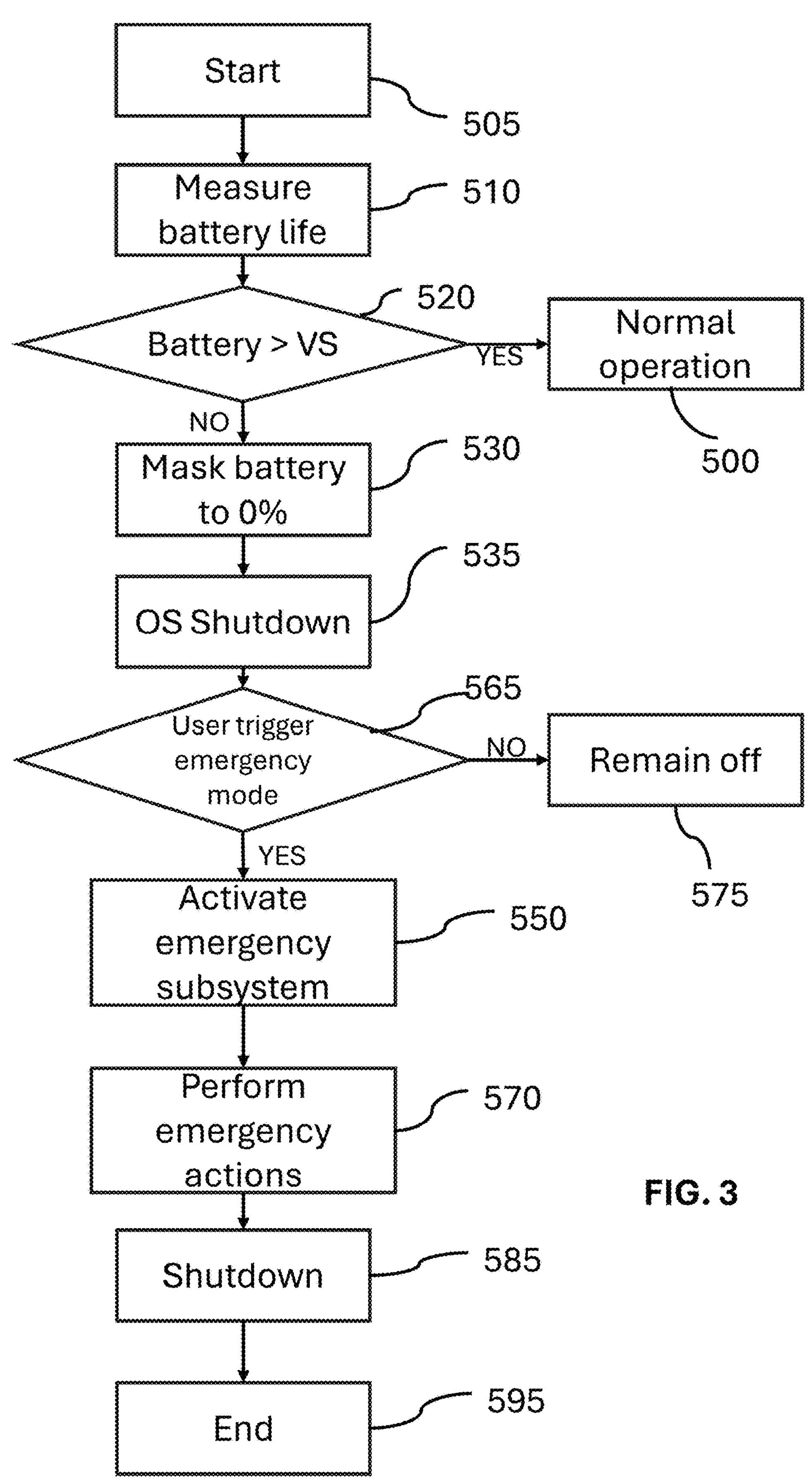
FIG. 3 presents a flowchart of the emergency activation process, outlining steps from battery level measurement to emergency operation execution or device shutdown.

FIG. 3 illustrates a flowchart of the emergency activation process for a portable electronic device, such as a cellular telephone, implementing the battery reserve feature according to an embodiment of the present disclosure. As shown in FIG. 3, the process commences at block 505. The battery detector 130 measures the real-time battery level at block 510, producing battery power information Vd. The host controller 110 compares Vd to the predefined reserve threshold VS, stored in the non-transitory memory 140, at block 520. The VS value may be pre-set by a third party or manufacturer, user-adjusted, or dynamically adjusted based on environmental factors, such as temperature or weather conditions affecting battery life, or location-based risk assessments using GPS or network data indicating a remote or high-risk area. If Vd exceeds VS, the device operates normally at block 500, with the main operating system 200 managing regular functions like calls, applications, and communications, and loops back to block 510 for continuous monitoring. If Vd is at or below VS, the masking module 195, at block 530, masks the real-time battery level by transmitting a masked battery value indicating full depletion to the main operating system 200, which, at block 535, shuts down or disables all non-essential device functions, preventing access to the reserved battery power during regular operations. Simultaneously, the display unit 150 displays a "no power" message or blank screen, creating the appearance of a fully depleted device while safeguarding the reserved battery capacity. At block 565, the host controller 110 monitors for a user interaction to trigger emergency mode, such as a specific physical interaction detected by the key input unit 160, typically pressing a designated button. If no interaction is detected, the device remains off at block 575, conserving power, and the process terminates at block 595. If the user triggers emergency mode, the host controller 110, at block 550, initiates the emergency mode upon user request by activating the emergency subsystem 300, enabling access to the reserved battery power for emergency operations. At block 570, the emergency subsystem 300 executes emergency operations, accessing preconfigured emergency contacts stored in the memory 140 to perform actions such as initiating an emergency call, sending GPS coordinates, capturing a screenshot of the display unit 150 to record critical information, sending a distress message, activating a loud alarm to attract attention, or launching a low-power communication protocol. Following these operations, the host controller 110 shuts down the device at block 585 to conserve any remaining power, concluding the process at block 595.

Figure 4:
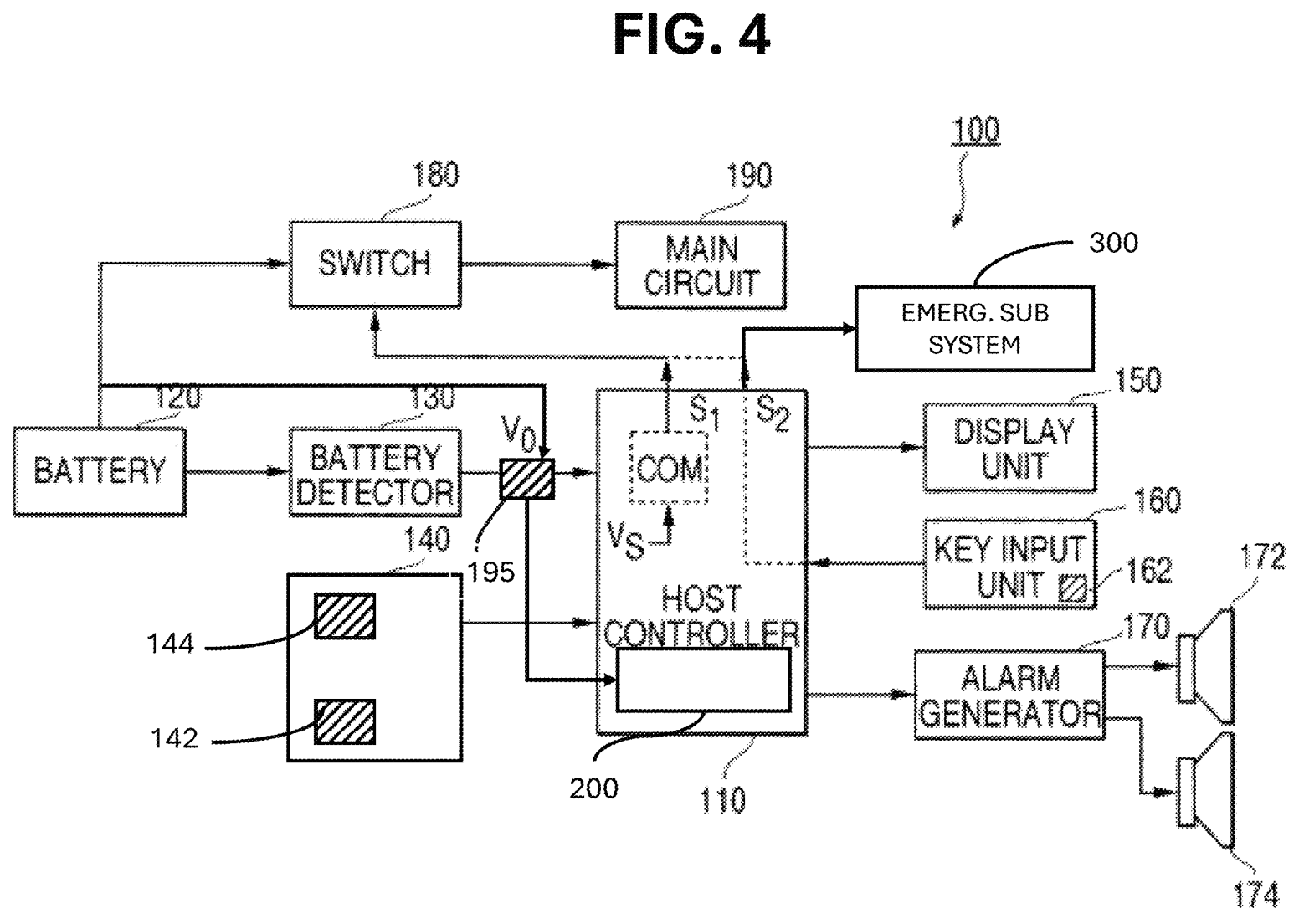

FIG. 4 illustrates a functional diagram of the host controller's process for monitoring battery levels and disabling regular operations when the reserve threshold is reached according to an embodiment of the present disclosure. As shown in FIG. 4, the host controller 110 may be configured to (constantly or intermittently) monitor and detect a low battery indication when the battery power information Vd indicating the detected power value from the battery detector 130 reaches the power setting information VS at block 310, alert the user of such a low battery indication by either blipping, via the speaker 172, or a number of vibrations, via the buzzer 174 at block 320, and then automatically disconnect the battery supply from the battery 120 to the main circuit 190 so as to disable operation of the cellular telephone 100 for purposes of making regular telephone calls at block 330.

Figure 5:
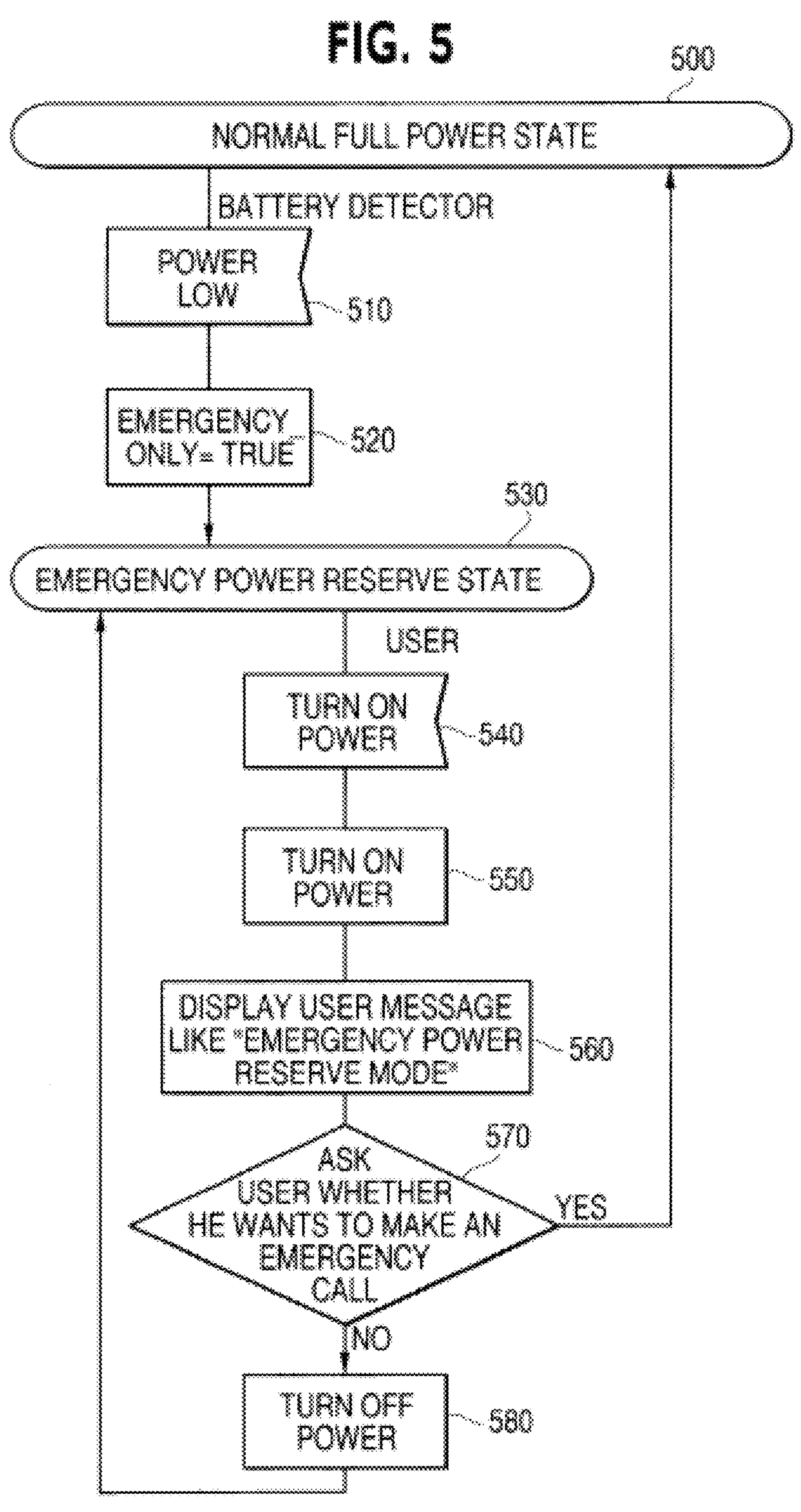
FIG. 5 presents a software diagram of the host controller's operation, detailing transitions between normal and emergency power reserve states with user-selected emergency actions.
Figures 6A, 6B, 6C:
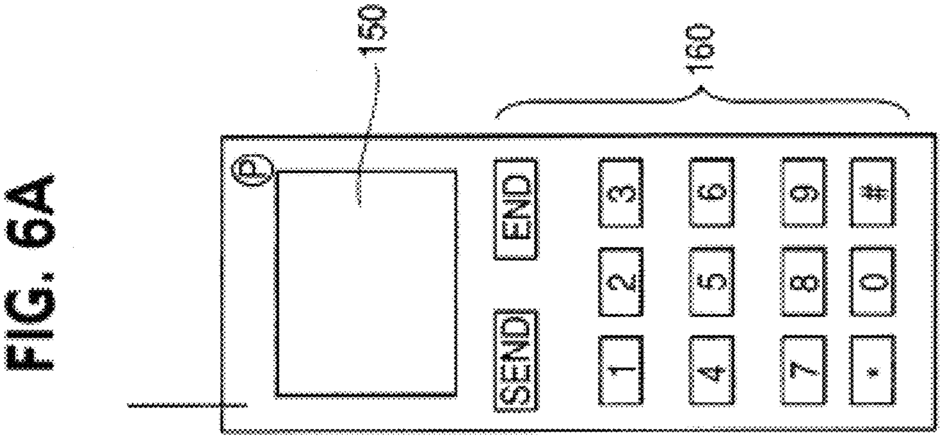
FIG. 6A shows a display indicating the device is out of battery in emergency power reserve mode.
FIG. 6B shows a display prompting the user to select an emergency action.
FIG. 6C depicts a display during the execution of a selected emergency function.

FIG. 5 illustrates a software diagram of a host controller 110 having the battery reserve feature for emergency use according to an embodiment of the present disclosure. The application software described may be written specifically for controlling the power supply from the battery 120, including the use of the battery reserve feature for emergency use according to an embodiment of the present disclosure. The host controller 110 allows the cellular telephone 100 to operate between a Normal Full Power State at block 500 and an Emergency Power Reserve State for making only emergency calls or performing emergency operations after the battery 120 has reached the power setting VS for purposes of making regular telephone calls. As shown in FIG. 5, the host controller 110 maintains the cellular telephone 100 in a Normal Full Power State at block 500. The battery power level is measured at block 510, and when the battery power is low—that is, when the battery power information Vd indicating the detected power value from the battery detector 130 is compared to the power setting information VS at block 520 and found to be at or below VS—the software of the host controller 110 masks the battery level to 0% at block 530, sets an emergency_only flag to TRUE at block 540, and switches the Normal Full Power State to an Emergency Power Reserve State at block 545, indicating that the cellular telephone 100 is out of battery as shown in FIG. 6A. At this point, the masking module 195 signals a 0% battery level to the main operating system 200, and the display unit 150 shows a "no power" message or blank screen to conceal the reserved power. Once the cellular telephone 100 is in an Emergency Power Reserve Mode, only emergency telephone calls or operations are permitted. The host controller 110 waits for the user to turn on the cellular telephone 100 or engage a specific physical interaction (e.g., pressing a designated button) at block 560. After the user has activated the emergency mode, the host controller 110 activates the power supply from the battery 120 to the emergency subsystem 300 at block 550 and provides a visual display of a user message such as "Emergency Power Reserve Mode" to alert the user that the cellular telephone 100 is in an Emergency Power Reserve Mode. Next, the host controller 110 provides a visual display asking the user whether they want to make an emergency call or perform another emergency operation as shown in FIG. 6B, at block 570. If the user does not want to proceed, the host controller 110 automatically shuts off the power supply from the battery 120 at block 580 and returns to the Emergency Power Reserve State at block 545. However, if the user desires to make an emergency call or perform an emergency operation at block 570, the host controller 110 enables the emergency subsystem 300 to execute the selected emergency function as shown in FIG. 6C, returning to the operational state for emergency functions at block 500.

FIG. 6 illustrates example displays of a portable electronic device, such as a cellular telephone, implementing the battery reserve feature for emergency use according to an embodiment of the present disclosure. FIG. 6A illustrates a display indicating the device is out of battery in emergency power reserve mode, showing a "no power" message or blank screen. FIG. 6B shows a display prompting the user to select an emergency action, such as making an emergency call or performing another operation. FIG. 6C depicts a display during the execution of a selected emergency function, such as an ongoing emergency call or data transmission.

Figure 7:
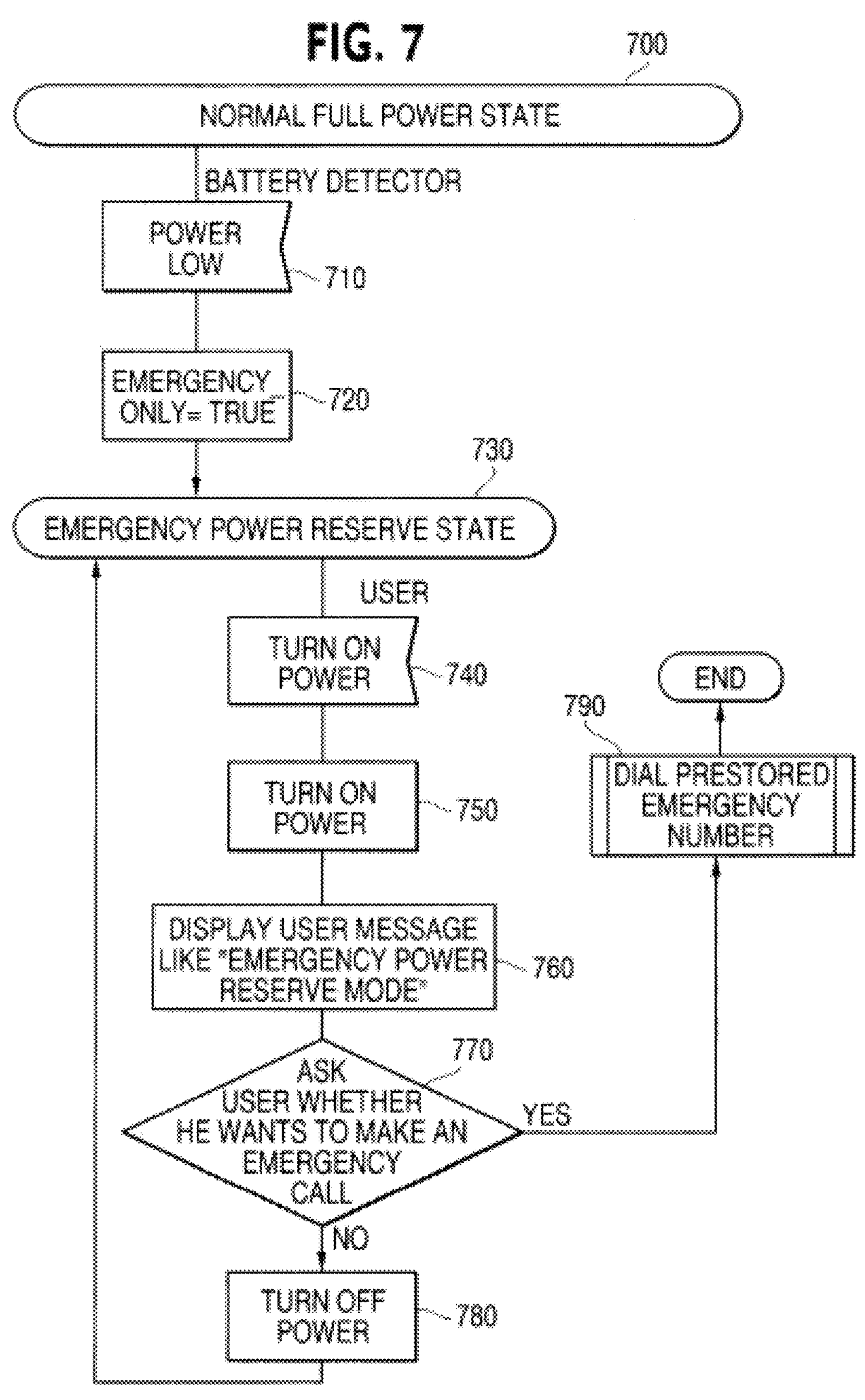
FIG. 7 illustrates a software diagram of the host controller's operation, similar to FIG. 5, but with automatic emergency action execution, such as dialing a pre-stored number.

FIG. 7 illustrates a software diagram of a host controller 110 having the battery reserve feature for emergency use according to another embodiment of the present disclosure, differing from FIG. 5 by enabling automatic execution of an emergency action. The application software described may be written specifically for controlling the power supply from the battery 120, including the use of the battery reserve feature for emergency use according to an embodiment of the present disclosure. The host controller 110 allows the cellular telephone 100 to operate between a Normal Full Power State at block 700 and an Emergency Power Reserve State for making only emergency calls or performing emergency operations after the battery 120 has reached the power setting VS for purposes of making regular telephone calls. As shown in FIG. 7, the host controller 110 maintains the cellular telephone 100 in a Normal Full Power State at block 700. The battery power level is measured at block 710, and when the battery power is low—that is, when the battery power information Vd indicating the detected power value from the battery detector 130 is compared to the power setting information VS at block 720 and found to be at or below VS—the software of the host controller 110 masks the battery level to 0% at block 730, sets an emergency_only flag to TRUE at block 740, and switches the Normal Full Power State to an Emergency Power Reserve State at block 730, indicating that the cellular telephone 100 is out of battery as shown in FIG. 6A. The masking module 195 signals a 0% battery level to the main operating system 200, and the display unit 150 shows a "no power" message or blank screen to mask the reserved power. When the cellular telephone 100 is in an Emergency Power Reserve Mode, only emergency telephone calls or operations are permitted. The host controller 110 waits for the user to turn on the cellular telephone 100 or engage a specific physical interaction (e.g., pressing a designated button) at block 760. After the user has activated the emergency mode, the host controller 110 activates the power supply from the battery 120 to the emergency subsystem 300 at block 750 and provides a visual display of a user message such as "Emergency Power Reserve Mode" to alert the user that the cellular telephone 100 is in an Emergency Power Reserve Mode. Next, the host controller 110 provides a visual display asking the user whether they want to make an emergency call or perform another emergency operation as shown in FIG. 6B, at block 570. If the user does not want to proceed, the host controller 110 automatically shuts off the power supply from the battery 120 at block 780 and returns to the Emergency Power Reserve State at block 730. However, if the user desires to make an emergency call or perform an emergency operation at block 770, the host controller 110 enables the emergency subsystem 300 to automatically dial a pre-stored emergency number (such as E911) or execute the selected emergency operation (e.g., sending GPS coordinates, taking a screenshot, etc.) for the user as shown in FIG. 6C, at block 790.

More specifically, the operation of the battery reserve feature for emergency use according to an embodiment of the present disclosure will be explained hereinbelow, with reference to the system architecture in FIG. 1 and the flowchart in FIG. 3.

First, the battery detector 130 detects the power level (e.g., voltage or current) of the battery 120 and sends the battery power information Vd, representing the real-time battery level, to the host controller 110, as shown in FIG. 1. The key input unit 160, when keyed by a user, can vary, through the host controller 110, the power setting information VS and the alarm setting information stored in the memory 140, unless the power setting VS has been pre-set by a third party or the manufacturer, or is dynamically adjusted based on usage or external conditions in the alternative embodiments. When the battery power information Vd reaches the power setting VS, the masking module 195 signals a masked battery value indicating full depletion to the main operating system 200, prompting the main operating system 200 to shut down or disable all non-essential device functions, preventing access to the reserved battery power during regular operations, while essential components remain powered for emergency use. Upon triggering an emergency mode via user interaction, the host controller 110 enables access to the reserved battery power for emergency operations, allowing access to emergency functionalities using the reserved battery capacity. In interlocking with the setting of the power setting information VS, the time taken from the beginning of alarming to the stop of feed of battery power from the battery 120 into the main circuit 190 for regular operations is automatically set. The alarm setting information may be selected from continuous sounding of an alarm, intermittent sounding of an alarm, flashing of a light instead of sounding of the alarm, and the like.

At the outset, the case where sounding of an alarm through the speaker 172 has been selected as the alarm setting information will be explained. The host controller 110 reads out the power setting information VS from the memory 140, compares the power setting information VS with the battery power information Vd from the battery detector 130, as facilitated by the components in FIG. 1, and, when the power level (e.g., voltage or current) in the battery power information Vd indicating the detected power value is higher than the power level in the power setting information VS (that is, when the battery power information Vd is above the lowest usable voltage or current, e.g., 20% of the battery power of the battery 120), energizes the switch 180 so that the battery power is fed into the main circuit 190 for making regular telephone calls. In this case, the alarm is not sounded.

On the other hand, when the power level in the battery power information Vd indicating the detected power value is lower than or equal to the power level in the power setting information VS (that is, when the battery power information Vd reaches the lowest usable voltage or current, e.g., 20% of the battery power of the battery 120), the host controller 110 reads out the alarm setting information from the memory 140 and outputs the alarm sound signal based on the alarm setting information to sound an alarm through the speaker 172. At or about the same time, based on the power setting information VS (which may be dynamically adjusted based on external conditions or location), the masking module 195 signals a masked battery value indicating full depletion to the main operating system 200, causing the display unit 150 to display a "no power" message or a blank screen, giving the appearance that the phone is completely inoperable, while preserving the reserved power for emergency use. After sounding the alarm, the host controller 110 outputs a switch control signal S1 so that the switch 180 switches from the feed of battery power to the stop of the feed of battery power from the battery 120 to the main circuit 190 for regular operations, disabling all non-essential device functions and preventing access to the reserved battery power during regular operations.

Method and means for setting various types of information and alarming will be explained in more detail. Incorporation of the setting of the power setting information VS and the alarm setting information into software, as one of the functions of the cellular telephone 100, enables the user to vary the setting while watching a setting screen displayed on the display unit 150, unless the power setting VS is fixed by a third party or manufacturer, or dynamically adjusted in the alternative embodiments.

The value of the power setting information VS, which can be set by the user (or pre-set by a third party/manufacturer, or dynamically adjusted), may be, for example, an integer in any permissible range, and, upon input of the numerical value from the key input unit 160 (or pre-configured/dynamic setting), the numerical value is stored as the predefined reserve threshold in the memory 140. In the host controller 110, the power setting information VS set in the memory 140 is compared with the battery power information Vd indicating the real-time battery level of the battery 120. In the dynamic adjustment embodiment, the host controller 110 may periodically recalculate VS based on real-time data, such as temperature readings from an onboard sensor, weather data from a network connection, usage patterns (e.g., heavy call or data use), or location data indicating a remote or high-risk area, increasing VS to, for example, 25% or 30% if conditions warrant a larger reserve.

In another embodiment of setting, the user (or a third party/manufacturer, or dynamic system) may set information that the battery power alarm is sounded a certain number of minutes before the residual capacity of the battery 120 becomes zero (the battery becomes unusable for regular operations due to lowering of voltage or current). The time may be selected from 0 to 5 minutes in 1-minute increments. Additionally or alternatively, the increments may be varied in length. The time until the residual capacity of the battery 120 becomes zero can be estimated to some extent based on the battery power at that time, and may be further refined by factoring in environmental conditions or location-based risk assessments that adjust VS dynamically. In this embodiment of setting as well, the power setting information VS stored in the memory 140 is converted to a numerical value in the same permissible range, although the screen in the setting by the user may be displayed so that the time value is input, where user modification is permitted.

Next, regarding the alarm setting information, the user may select one option from the choices displayed on the screen. The choices include no alarm, alarm via the speaker 172 or via the buzzer 174, flashing of a lamp, and the like. In this case, for no alarm, the alarm for the residual capacity of the battery is not sounded at all; for alarm, the alarm for the residual capacity of the battery is sounded, for example, every 5 seconds or 10 seconds. For flashing of light, the call incoming lamp may be flashed instead of sounding the alarm.

Regarding the method for giving the alarm for the battery power to the user, playing of music, increase or decrease in the number of times of sounding, narrowing of sounding intervals, and the like may be mentioned in addition to the above-described no alarm, alarm, and flashing of light. During waiting, the alarm for the battery power is sounded through a speaker 172. Alternatively, during talking over the portable electronic device such as the cellular telephone, the alarm for the battery power is sounded through a receiver (not shown). When sounding the alarm through the speaker 172, the host controller 110 outputs an alarm sound signal to the speaker 172. Similarly, when sounding the alarm through the receiver (not shown), the host controller 110 outputs an alarm sound signal to the receiver (not shown). In the case of the lighting (or flashing) of light, the call incoming lamp may be lighted (or flashed) independently of whether the cellular telephone is in the state of waiting or talking.

The host controller 110 may be configured to allow the user to make an emergency call or perform other emergency operations when the cellular telephone 100 is turned on, any time after the battery 120 has reached the power setting VS and appears to have run out of power for purposes of making regular telephone calls. These emergency operations, enabled by the emergency subsystem 300, may include, but are not limited to, contacting 911 or pre-stored emergency numbers, sending GPS coordinates to designated emergency contacts, taking a screenshot of the phone display (e.g., to capture critical information), sending a pre-recorded distress message to emergency contacts, activating a loud alarm through the speaker 172 to attract attention from nearby individuals in a crisis, or launching a low-power communication protocol for emergency alerts. The emergency mode may be activated by a specific physical interaction, such as pressing a designated button, triggering an emergency mode and ensuring accessibility even when the device appears inoperable. Software diagrams of the host controller 110 having the battery reserve feature for emergency use are shown in FIGS. 3, 5, and 7. Examples of a cellular telephone 100 having the battery reserve feature for emergency use according to an embodiment of the present disclosure are shown in FIGS. 6A-6C.

As described from the foregoing, the battery reserve feature of the portable electronic device such as the cellular telephone according to an embodiment of the present disclosure advantageously allows the user to make an emergency call, such as E911 or any other pre-stored emergency number, or perform other critical emergency operations, even if the battery appears to have run down. As a result, the user is always provided with access to such a cellular telephone in cases of emergency regardless of the apparent condition of its battery.

Figure 8:
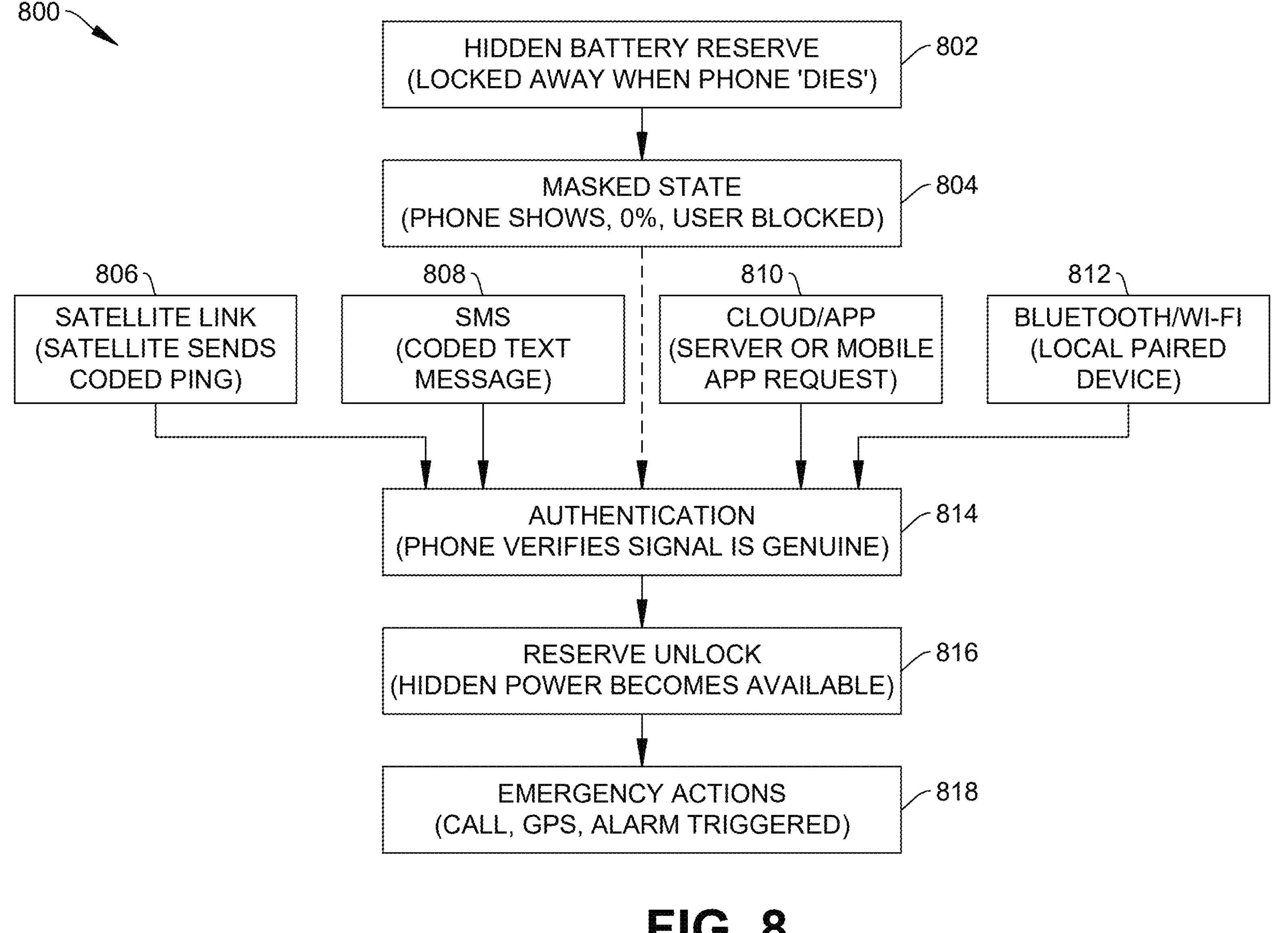
FIG. 8 presents a flowchart of a method for remote activation and emergency operation with a masked battery reserve.

The present disclosure further encompasses remote activation capabilities that extend beyond local user-initiated emergency activation. Referring to FIG. 8, a method 800 illustrates a remote activation and emergency operation system for a portable electronic device with masked battery reserve functionality. The method 800 may provide multiple communication pathways for receiving activation signals from external sources, enabling emergency functionality to be triggered remotely when users may be unable to manually activate emergency operations through local device interactions, such as in situations where users are incapacitated, unconscious, or otherwise unable to physically operate the device.

The method 800 may commence at a step 802 where a hidden battery reserve is locked away when the phone dies. At the step 802, the masking module 195 may conceal the reserved battery capacity from the main operating system 200 and user interface when the battery power information Vd reaches the power setting information VS. The step 802 may establish the initial state where the reserved battery capacity becomes inaccessible to regular device functions while remaining available for emergency operations upon proper activation.

Following the reserve locking at the step 802, the method 800 may proceed to a step 804 where the masking state is shown as a user blocked state with the phone showing 0% battery. At the step 804, the display unit 150 may present a blank screen or "no power" message to users, creating the visual appearance that the cellular telephone 100 has completely depleted battery power. The step 804 may coordinate with the masking module 195 to ensure consistent presentation of the depleted battery state across all user-facing interfaces while the reserved capacity remains hidden and protected.

The method 800 may incorporate multiple communication pathways for receiving remote activation signals, providing various options for emergency activation. At a step 806, the method 800 may involve a satellite link or coded ping being sent to the device. The step 806 may enable reception of activation signals through satellite communication links, including L-band or IoT satellite connections that may remain operational during emergency scenarios where cellular access may be unavailable. The satellite communication pathway may provide activation capabilities in remote locations or during widespread communication infrastructure disruptions where terrestrial communication networks may be compromised.

Alternatively, the method 800 may proceed to a step 808 where an SMS coded text message is received. At the step 808, the communication module may receive activation signals from trusted contacts via encrypted SMS messages containing authentication data. The step 808 may enable authorized contacts to remotely trigger emergency functionality when users may be incapacitated or unable to manually activate emergency operations. The SMS pathway may utilize existing cellular communication infrastructure to deliver activation signals with cryptographic authentication to ensure signal integrity and prevent unauthorized activation attempts.

In another embodiment, the method 800 may continue with cloud-based activation capabilities at a step 810 where a cloud app server or mobile app request is processed. At the step 810, the communication module may receive activation signals from cloud-based server requests via HTTPS connections. The step 810 may enable remote activation through internet-based communication pathways where authorized applications or services can transmit activation requests to the device through secure web protocols. The cloud server activation pathway may provide activation capabilities through internet connectivity when other communication channels may be unavailable or compromised.

As shown in FIG. 8, the method 800 may alternatively incorporate local wireless activation at a step 812 where a Bluetooth broadcast is transmitted. At the step 812, the communication module may receive activation signals through local wireless connections including Bluetooth LE or Wi-Fi Direct. The step 812 may enable nearby authorized devices to trigger emergency functionality through short-range wireless communication protocols when users may be in proximity to trusted contacts or emergency responders who possess appropriate authentication credentials.

Following the reception of an activation signal through any one of the various communication pathways, the method 800 may proceed to a step 814 where authentication of the activation signal is performed to verify that the signal is genuine. At the step 814, the authentication module may validate the incoming activation request using pre-authorized contact lists and cryptographic verification mechanisms. The step 814 may implement multi-layered authentication processes including identity verification against stored contact lists, message integrity checking through cryptographic signatures, and replay attack protection through timestamp validation to ensure that only legitimate activation requests can proceed to reserve unlocking operations.

After successful authentication at the step 814, the method 800 may advance to a step 816 where the reserve unlock makes hidden power available. At the step 816, the masking module 195 may cease masking operations and may enable the battery management module to report the actual battery capacity to system components. The step 816 may coordinate with the host controller 110 to transition the device from the masked reserve state to an active emergency power state where the reserved battery capacity becomes accessible for emergency operations.

The method 800 may conclude with emergency action execution at a step 818 where emergency actions such as call, GPS, and alarm are triggered. At the step 818, the emergency subsystem 300 may execute various emergency operations including initiating emergency calls to preconfigured contacts, transmitting current GPS location coordinates to designated emergency contacts, and activating audible alarms through the speaker 172 and buzzer 174. The step 818 may access emergency contact information stored in the memory 140 and may coordinate multiple emergency response actions simultaneously to maximize the effectiveness of the emergency communication efforts.

The method 800 may provide comprehensive remote activation capabilities that accommodate multiple communication channels to ensure activation reliability in diverse emergency scenarios. Any one of the satellite activation channel, trusted contact SMS pathway, cloud server activation pathway, or local wireless activation pathway may be utilized to trigger emergency functionality. The satellite activation channel may function independently of terrestrial communication infrastructure, providing activation capabilities in remote locations or during widespread communication outages. The trusted contact SMS pathway may enable family members, friends, or emergency contacts to remotely trigger emergency functionality when users may be unable to manually activate the device.

The cloud server activation pathway may enable integration with emergency services, monitoring applications, or automated emergency response systems that can trigger device activation based on external emergency detection criteria. The local wireless activation pathway may facilitate activation by nearby emergency responders or authorized personnel who may be in physical proximity to the device during emergency situations.

The multiple communication pathways may operate independently or in combination to provide redundant activation capabilities that enhance the reliability of emergency functionality access. The authentication mechanisms may ensure that activation requests originate from authorized sources while preventing unauthorized access to the reserved battery capacity, maintaining the security and integrity of the emergency functionality throughout the remote activation process.

Figure 9:
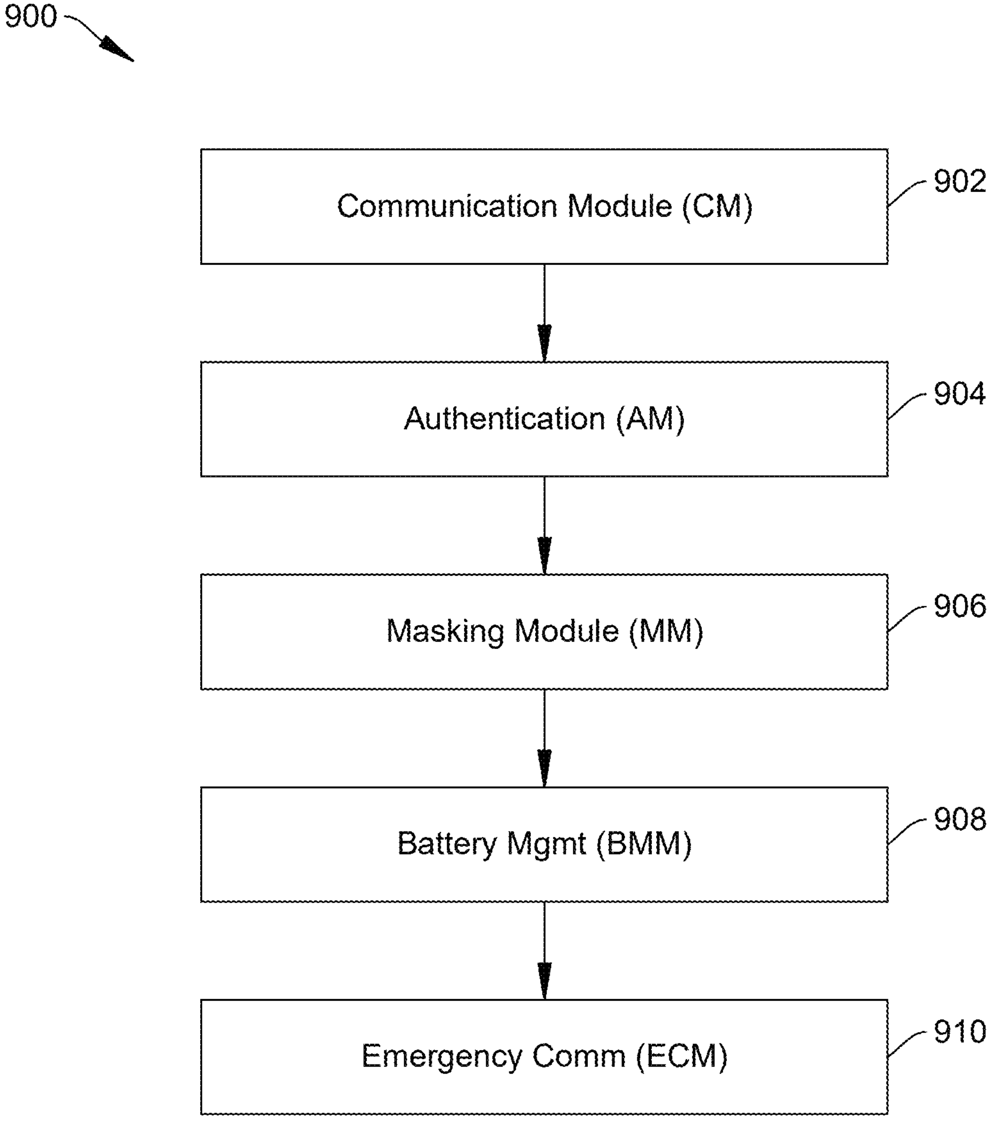
FIG. 9 illustrates a system of cooperating modules arranged in a sequential flow architecture.

Referring to FIG. 9, a system 900 comprises five cooperating modules arranged in a sequential flow architecture that enables remote activation and emergency operation functionality for the masked battery reserve feature. The system 900 may provide a modular approach to processing activation signals from initial reception through authentication, masking operations, battery management, and emergency response execution, ensuring coordinated operation of the remote activation capabilities while maintaining security and operational integrity.

The system 900 may begin with a communication module 902 positioned at the initial stage of the sequential flow architecture. The communication module 902 may receive incoming activation signals through multiple communication channels including satellite communication links, encrypted SMS messages, cloud-based server requests via HTTPS connections, and local wireless connections such as Bluetooth LE or Wi-Fi Direct. The communication module 902 may normalize signal formats from different communication channels and may forward the processed signals to subsequent modules in the system 900 for authentication and validation operations.

The communication module 902 may interface with various communication protocols to accommodate the diverse activation pathways supported by the remote activation functionality. For satellite communication, the communication module 902 may process L-band or IoT satellite signals that enable activation in remote locations where terrestrial communication infrastructure may be unavailable. For SMS activation, the communication module 902 may receive and decrypt encrypted text messages containing authentication data from trusted contacts. For cloud-based activation, the communication module 902 may process HTTPS requests from authorized server applications or mobile applications that can trigger emergency functionality remotely.

Following the communication module 902, the system 900 may include an authentication module 904 that receives the processed activation signals and performs validation operations to verify signal authenticity and authorization. The authentication module 904 may implement multi-layered authentication mechanisms including identity verification against pre-authorized contact lists stored in the memory 140, cryptographic signature validation using AES-256 keys, and timestamp verification to prevent replay attacks. The authentication module 904 may maintain cryptographic identifiers for each trusted contact and may perform message integrity checking through HMAC signatures to ensure that activation requests originate from legitimate sources.

The authentication module 904 may incorporate channel-specific authentication rules that accommodate the different security requirements and capabilities of various communication pathways. For satellite activation, the authentication module 904 may validate signed ping packets with minimal data overhead to accommodate satellite communication constraints. For SMS activation, the authentication module 904 may process short payloads containing encrypted nonce values that provide authentication while remaining within SMS message size limitations. For Bluetooth activation, the authentication module 904 may execute challenge-response exchanges that provide secure authentication through local wireless communication protocols.

As shown in FIG. 9, the system 900 may continue with a masking module 906 that receives authenticated activation signals from the authentication module 904 and manages the concealment of reserve charge from user-facing systems. The masking module 906 may operate in three distinct states: a normal state where the reserve remains hidden from the main operating system 200 and user interface, a pre-activation state where activation is pending and verification is in progress, and an unlocked state where the reserve becomes accessible for emergency operations.

The masking module 906 may interface between the battery detector 130 and the main operating system 200 to control the battery level information that reaches system components during normal operation. When the system 900 operates in normal mode, the masking module 906 may transmit modified battery level values that conceal the reserved capacity from the main operating system 200. Upon receiving authenticated activation signals from the authentication module 904, the masking module 906 may transition to the pre-activation state and may prepare to cease masking operations to reveal the reserved battery capacity.

Following the masking module 906, the system 900 may include a battery management module 908 that maintains the division of total battery capacity into main and reserve portions and executes reserve unlocking operations upon receiving confirmation from the masking module 906. The battery management module 908 may interact directly with the power HAL (Hardware Abstraction Layer) to control battery capacity reporting and may maintain a reserve table that stores information regarding the allocation of battery capacity between regular operation and emergency reserve functions.

The battery management module 908 may execute reserve unlocking operations by updating internal capacity mapping and coordinating with the power HAL to notify the main operating system 200 of the newly available charge state. The battery management module 908 may implement functions including maskBatteryReserve( ) for concealing reserve capacity during normal operation, unlockReserve( ) for enabling access to reserved capacity upon authentication, and reportStateOfCharge( ) for providing accurate battery status information to system components during emergency operations.

The system 900 may conclude with an emergency communication module 910 that receives activation confirmation from the battery management module 908 and executes emergency protocols using the unlocked battery reserve capacity. The emergency communication module 910 may coordinate multiple emergency response actions including unlocking the battery reserve, transmitting GPS coordinates to designated emergency contacts, dispatching predefined SOS messages, and optionally triggering audible alarms or continuous beacon transmission to facilitate location tracking by rescue personnel.

The emergency communication module 910 may access emergency contact information stored in the memory 140 and may utilize the reserved battery capacity to transmit critical data through available communication channels. The emergency communication module 910 may implement beacon functionality that adapts transmission frequency and payload to preserve battery life while maintaining reliable detectability in emergency conditions. The beacon transmission may continue until the reserved battery capacity becomes depleted, maximizing the duration of emergency communication capabilities.

The sequential arrangement of modules in the system 900 may demonstrate a coordinated flow of processing where each module performs distinct functions while maintaining communication with adjacent modules in the processing chain. The communication module 902 may forward normalized activation signals to the authentication module 904, which may validate the signals and forward authenticated requests to the masking module 906. The masking module 906 may coordinate with the battery management module 908 to unlock the reserved capacity, which may then enable the emergency communication module 910 to execute emergency response protocols.

The modular architecture of the system 900 may provide operational flexibility and security by segregating different aspects of the remote activation functionality into specialized components. Each module may operate independently within its designated function while maintaining coordinated communication with other modules to ensure reliable execution of the complete remote activation and emergency response sequence. The sequential flow architecture may ensure that activation signals undergo proper validation and authentication before accessing the reserved battery capacity, maintaining the security and integrity of the emergency functionality throughout the remote activation process.

Figure 10:
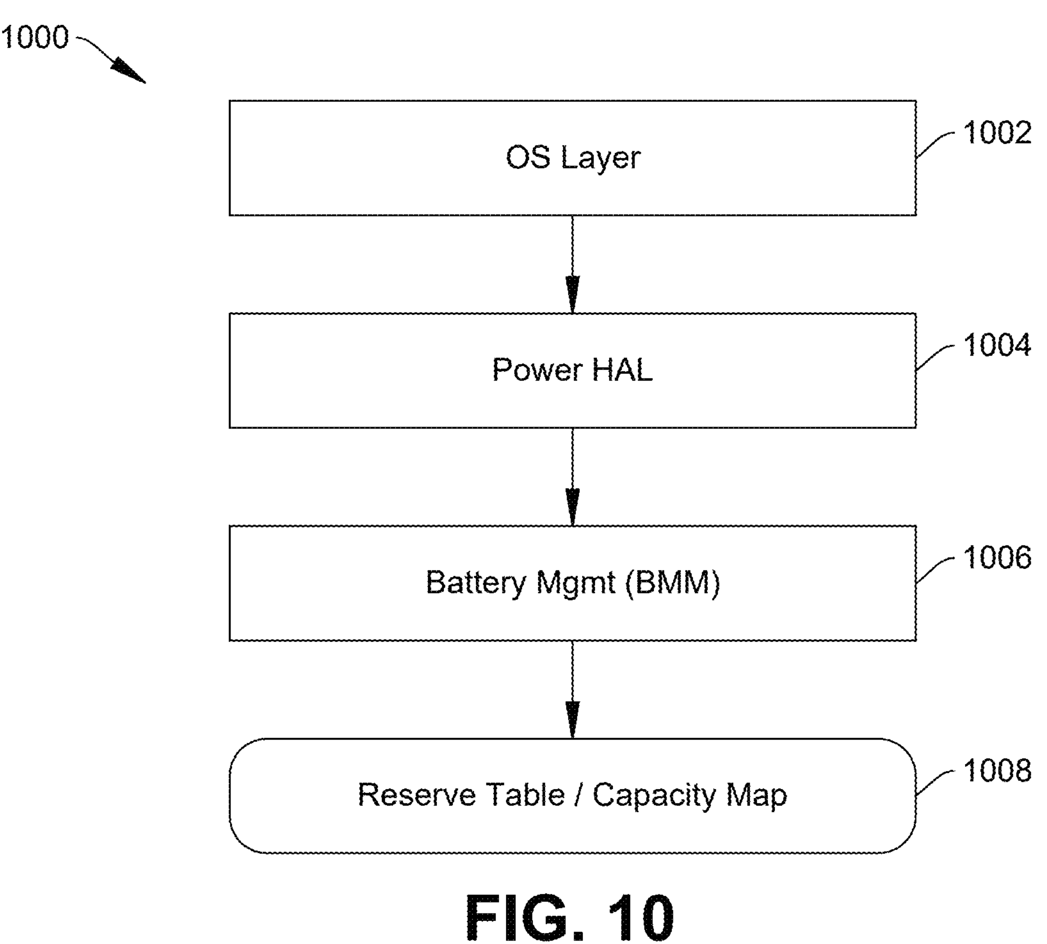
FIG. 10 depicts the communication flow between software and hardware layers for battery management.

Referring to FIG. 10, a process 1000 depicts the communication flow between software and hardware layers for battery management within the cellular telephone 100. The process 1000 may illustrate a hierarchical communication structure that enables the battery management module 908 to interface with system components at multiple abstraction levels while maintaining control over battery capacity reporting and reserve functionality.

The process 1000 may begin at an OS layer 1002, which represents the operating system level of the cellular telephone 100 where the main operating system 200 manages regular device operations including user interface functions, application execution, and communication protocols. The OS layer 1002 may serve as the highest level of the software hierarchy and may receive battery status information that has been processed through lower system layers. The OS layer 1002 may utilize battery status information to make decisions regarding power management, application restrictions, and user interface presentations related to battery capacity.

The process 1000 may proceed from the OS layer 1002 to a power HAL 1004, which serves as the hardware abstraction layer that interfaces between the main operating system 200 and the underlying battery hardware components. The power HAL 1004 may provide a standardized interface that enables the OS layer 1002 to access battery information without requiring direct interaction with hardware-specific implementations. The power HAL 1004 may receive battery status requests from the OS layer 1002 and may forward these requests to lower-level system components while abstracting the hardware-specific details of battery monitoring and management operations.

From the power HAL 1004, the process 1000 may continue to a battery management module 1006, which manages the battery capacity allocation and reserve functionality within the cellular telephone 100. The battery management module 1006 may correspond to the battery management module 908 described in the system 900 and may implement the core functionality for dividing total battery capacity into main and reserve portions. The battery management module 1006 may interface directly with the power HAL 1004 to execute reserve unlocking operations and to report masked charge data to upper system layers during normal operation.

The battery management module 1006 may maintain communication pathways with the power HAL 1004 to provide battery status information that may be either masked or unmasked depending on the current operational state of the device. During normal operation, the battery management module 1006 may transmit modified battery level values through the power HAL 1004 that conceal the reserved battery capacity from the OS Layer 1002. When emergency mode activation occurs, the battery management module 1006 may cease masking operations and may report the actual available battery capacity through the power HAL 1004 to enable emergency operations.

As shown in FIG. 10, the process 1000 may connect the battery management module 1006 to a reserve table 1008, which stores information regarding the division of battery capacity into main and reserve portions. The reserve table 1008 may contain data structures that define the allocation of total battery capacity between regular device operations and emergency reserve functionality. The reserve table 1008 may provide the underlying data that the battery management module 1006 uses to determine when masking operations should be initiated and to calculate the appropriate battery level values to report to upper system layers.

The reserve table 1008 may store configuration parameters including the reserve threshold value that corresponds to the power setting information VS, the percentage of total battery capacity allocated to the reserve portion, and operational parameters that control the masking behavior during different device states. The battery management module 1006 may access the reserve table 1008 to retrieve current reserve allocation settings and may update the reserve table 1008 when reserve unlocking operations occur or when configuration changes are made to the reserve functionality.

The hierarchical communication structure demonstrated by the process 1000 may ensure that battery state information flows through multiple layers with appropriate processing and filtering at each level. The reserve table 1008 may provide the foundational data that enables the battery management module 1006 to implement masking operations, while the power HAL 1004 may serve as the interface layer that enables communication between the battery management module 1006 and the OS Layer 1002. This layered architecture may provide operational security by preventing direct access to reserve functionality from higher system layers while maintaining the ability to report accurate battery information when emergency operations are authorized.

Figure 11:
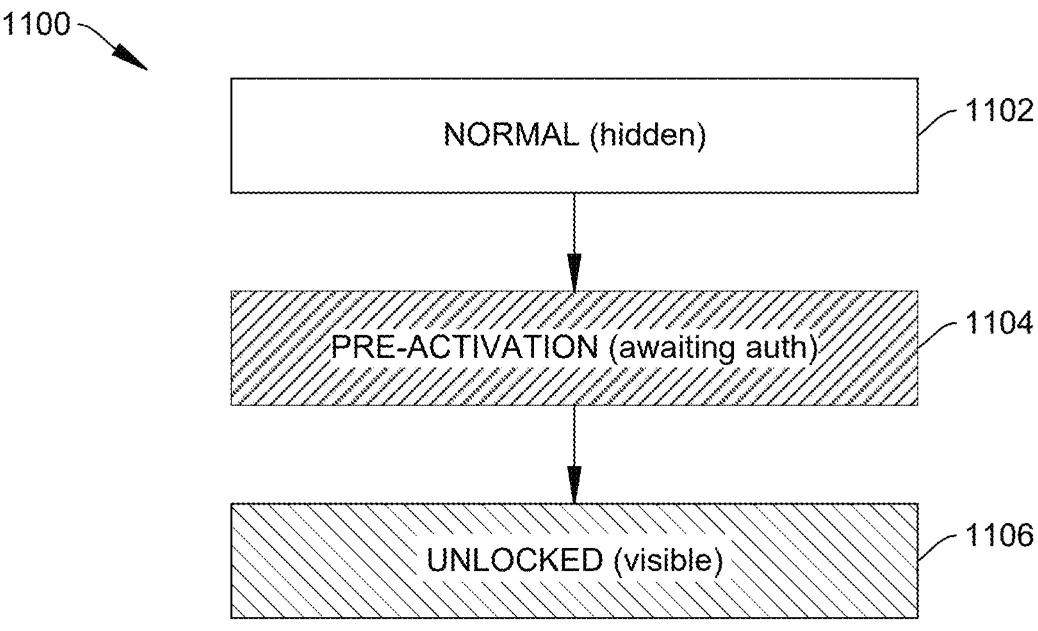
FIG. 11 presents the state transitions of a masking module.

Referring to FIG. 11, a process 1100 illustrates the state transitions of the masking module 195 through three distinct operational states that control the visibility and accessibility of the reserved battery capacity. The process 1100 may demonstrate how the masking module 195 manages the concealment and revelation of battery reserve information based on device operational state and authentication status, ensuring that the reserved capacity remains protected during normal operation while becoming available when emergency functionality is properly activated.

The process 1100 may begin at a step 1102 labeled "NORMAL (hidden)," which represents the initial operational state where the battery reserve remains concealed from both the main operating system 200 and user-facing interfaces. At the step 1102, the masking module 195 may actively intercept battery status information from the battery detector 130 and may transmit modified battery level values to the main operating system 200 that exclude the reserved battery capacity from reported charge levels. The step 1102 may represent the default operational state that persists throughout regular device operation until an activation event occurs.

During the step 1102, the masking module 195 may coordinate with the battery management module 1006 to ensure consistent masking of reserve capacity across all system interfaces. The masking module 195 may receive actual battery level information from the battery detector 130 and may calculate modified battery level values that reflect only the main battery portion available for regular device operations. The step 1102 may maintain this masking operation continuously to prevent users and applications from detecting or accessing the reserved battery capacity during normal device use.

From the step 1102, the process 1100 may transition to a step 1104 labeled "PRE-ACTIVATION (awaiting auth)," which represents an intermediate operational state where an activation request has been received and authentication verification is in progress. The step 1104 may occur when the communication module 902 receives an activation signal through any of the supported communication channels, including satellite links, SMS messages, cloud server requests, or local wireless connections. During the step 1104, the masking module 195 may maintain concealment of the reserved battery capacity while the authentication module 904 performs validation operations on the received activation signal.

At the step 1104, the masking module 195 may prepare for potential reserve unlocking operations while maintaining security of the reserved capacity until authentication is successfully completed. The step 1104 may represent a transitional state where the masking module 195 remains in protective mode but may begin preparation for state transition to enable rapid response upon successful authentication. The masking module 195 may coordinate with the authentication module 904 during the step 1104 to receive authentication status updates and to respond appropriately based on the validation results.

The process 1100 may incorporate conditional flow logic at the step 1104 based on the results of authentication operations performed by the authentication module 904. When authentication fails, the process 1100 may return to the step 1102 to maintain normal masking operations and to preserve the concealment of reserved battery capacity. When authentication succeeds, the process 1100 may proceed to the final operational state for reserve access.

Following successful authentication, the process 1100 may advance to a step 1106 labeled "UNLOCKED (visible)," which represents the final operational state where the battery reserve becomes accessible and visible to system components. At the step 1106, the masking module 195 may cease masking operations and may enable the battery management module 1006 to report the actual available battery capacity to the power HAL 1004 and subsequently to the OS Layer 1002. The step 1106 may coordinate the transition from concealed reserve state to active emergency power state, enabling the emergency subsystem 300 to access the reserved battery capacity for emergency operations.

During the step 1106, the masking module 195 may coordinate with the battery management module 908 to update internal capacity mapping and to notify system components of the newly available battery capacity. The step 1106 may enable the emergency communication module 910 to execute emergency protocols using the unlocked battery reserve, including transmission of GPS coordinates, dispatch of SOS messages, and activation of beacon functionality. The masking module 195 may maintain the step 1106 state until the reserved battery capacity becomes depleted through emergency operations or until the device is reset to normal operational mode.

The three-state operation of the masking module 195 demonstrated by the process 1100 may provide systematic control over reserve visibility and access while maintaining operational security throughout the activation process. The sequential progression from the step 1102 through the step 1104 to the step 1106 may ensure that reserved battery capacity remains protected until proper authentication is completed, while enabling rapid transition to emergency functionality when legitimate activation occurs. The state-based architecture may prevent unauthorized access to reserved capacity while maintaining reliable availability of emergency functionality when properly activated through authenticated channels.

Figure 12:
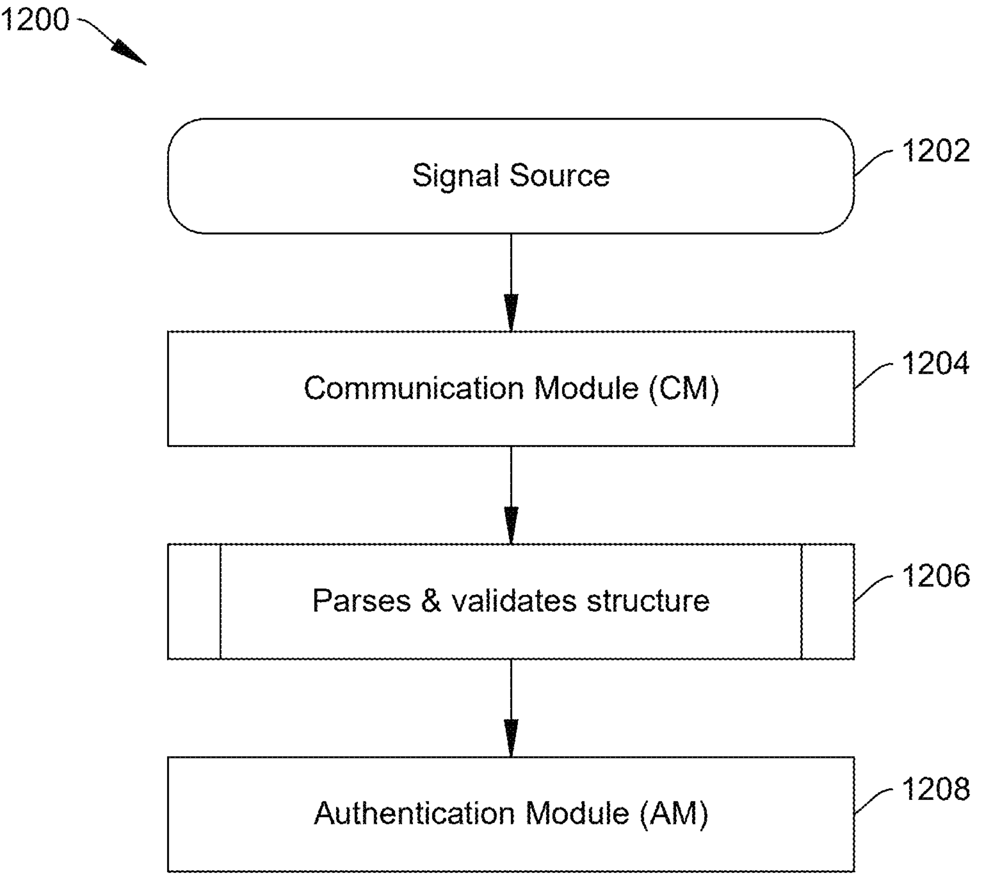
FIG. 12 depicts a flowchart of the signal processing flow through authentication.

Referring to FIG. 12, a process 1200 depicts signal processing flow through authentication for the remote activation system of the cellular telephone 100. The process 1200 may illustrate the sequential flow of activation signal reception, structural validation, and preparation for authentication verification, ensuring that incoming activation requests undergo proper processing before authentication operations are performed.

The process 1200 may begin with a signal source 1202, which generates or transmits an activation signal intended to trigger emergency functionality in the cellular telephone 100. The signal source 1202 may represent various external entities capable of initiating remote activation, including trusted contacts using mobile devices, satellite communication systems, cloud-based server applications, or nearby devices equipped with local wireless communication capabilities. The signal source 1202 may generate activation signals containing authentication data, contact identification information, and command instructions that specify the type of emergency activation being requested.

The signal source 1202 may transmit activation signals through different communication pathways depending on the available communication infrastructure and the specific activation scenario. For satellite-based activation, the signal source 1202 may comprise satellite communication terminals or emergency beacons that transmit L-band or IoT satellite signals containing signed ping packets with minimal data overhead. For SMS-based activation, the signal source 1202 may comprise mobile devices operated by trusted contacts that send encrypted text messages containing authentication nonce values and emergency activation commands.

The activation signals from the signal source 1202 may flow to a communication module 1204, which receives incoming activation signals through the multiple communication channels supported by the remote activation system. The communication module 1204 may correspond to the communication module 902 described in the system 900 and may implement the initial stage of signal processing for remote activation functionality. The communication module 1204 may be configured to interface with various communication protocols including satellite communication links, cellular SMS messaging, HTTPS-based cloud server communications, and local wireless protocols such as Bluetooth LE or Wi-Fi Direct.

The communication module 1204 may perform initial signal processing operations including signal demodulation, protocol-specific decoding, and format normalization to prepare activation signals for subsequent processing stages. For satellite signals, the communication module 1204 may demodulate L-band transmissions and may extract digital data packets containing activation requests. For SMS signals, the communication module 1204 may receive text messages through cellular communication interfaces and may extract encrypted payload data from the message content. For cloud-based signals, the communication module 1204 may process HTTPS requests received through internet connectivity and may extract activation data from secure web protocol transmissions.

Following initial signal processing, the communication module 1204 may forward the processed activation signals to a step 1206 where signal parsing and structural validation operations are performed. At the step 1206, the system may analyze the structure and format of the received activation signals to ensure that the signals conform to expected data formats and contain the required information elements for authentication processing. The step 1206 may implement validation checks including data packet integrity verification, format compliance checking, and completeness validation to ensure that activation signals contain all necessary components for subsequent authentication operations.

The step 1206 may perform structural validation by examining the data packet headers, payload organization, and field formatting to verify that activation signals conform to the expected protocol specifications for each communication channel. For satellite activation signals, the step 1206 may validate the packet structure of signed ping packets and may verify that required authentication fields are present and properly formatted. For SMS activation signals, the step 1206 may validate the message structure and may verify that encrypted payload data is properly encoded and contains the expected data elements.

The structural validation operations at the step 1206 may include verification of data packet size limitations, field boundary checking, and format consistency validation to ensure that activation signals can be properly processed by subsequent authentication operations. The step 1206 may reject activation signals that fail structural validation checks and may log validation failures for security monitoring purposes. Successfully validated activation signals may be prepared for forwarding to authentication processing components.

Following successful structural validation at the step 1206, the process 1200 may proceed to an authentication module 1208, which receives the validated activation signals and performs authentication verification operations to confirm the legitimacy of activation requests. The authentication module 1208 may correspond to the authentication module 904 described in the system 900 and may implement multi-layered authentication mechanisms to verify that activation requests originate from authorized sources.

The authentication module 1208 may receive the structurally validated activation signals from the step 1206 and may initiate comprehensive authentication verification processes including identity verification against pre-authorized contact lists stored in the memory 140, cryptographic signature validation using stored authentication keys, and timestamp verification to prevent replay attacks. The authentication module 1208 may access the pre-authorized contact list to verify that the activation request originates from a trusted contact with appropriate authorization to trigger emergency functionality.

The authentication module 1208 may implement channel-specific authentication procedures that accommodate the different security capabilities and constraints of various communication pathways. For satellite activation signals, the authentication module 1208 may validate cryptographic signatures on ping packets while accommodating the limited data capacity of satellite communication channels. For SMS activation signals, the authentication module 1208 may decrypt encrypted nonce values and may verify the authenticity of the activation request through cryptographic validation of the decrypted data.

The sequential flow demonstrated by the process 1200 may ensure that activation signals undergo systematic processing from initial reception through structural validation to authentication preparation, maintaining security and reliability throughout the signal processing chain. The signal source 1202 may initiate the process by transmitting properly formatted activation signals, while the communication module 1204 may provide the interface layer that enables reception and initial processing of signals from diverse communication channels. The step 1206 may ensure that only properly formatted signals proceed to authentication processing, while the authentication module 1208 may provide the final verification stage that determines whether activation requests are authorized to proceed to reserve unlocking operations.

The process 1200 may provide a systematic approach to signal processing that accommodates the diverse communication channels supported by the remote activation system while maintaining consistent security and validation standards across all activation pathways. The sequential progression from signal reception through structural validation to authentication preparation may ensure that the remote activation system can reliably process legitimate activation requests while rejecting malformed or unauthorized signals that could potentially compromise the security of the reserved battery capacity.

Figure 13:
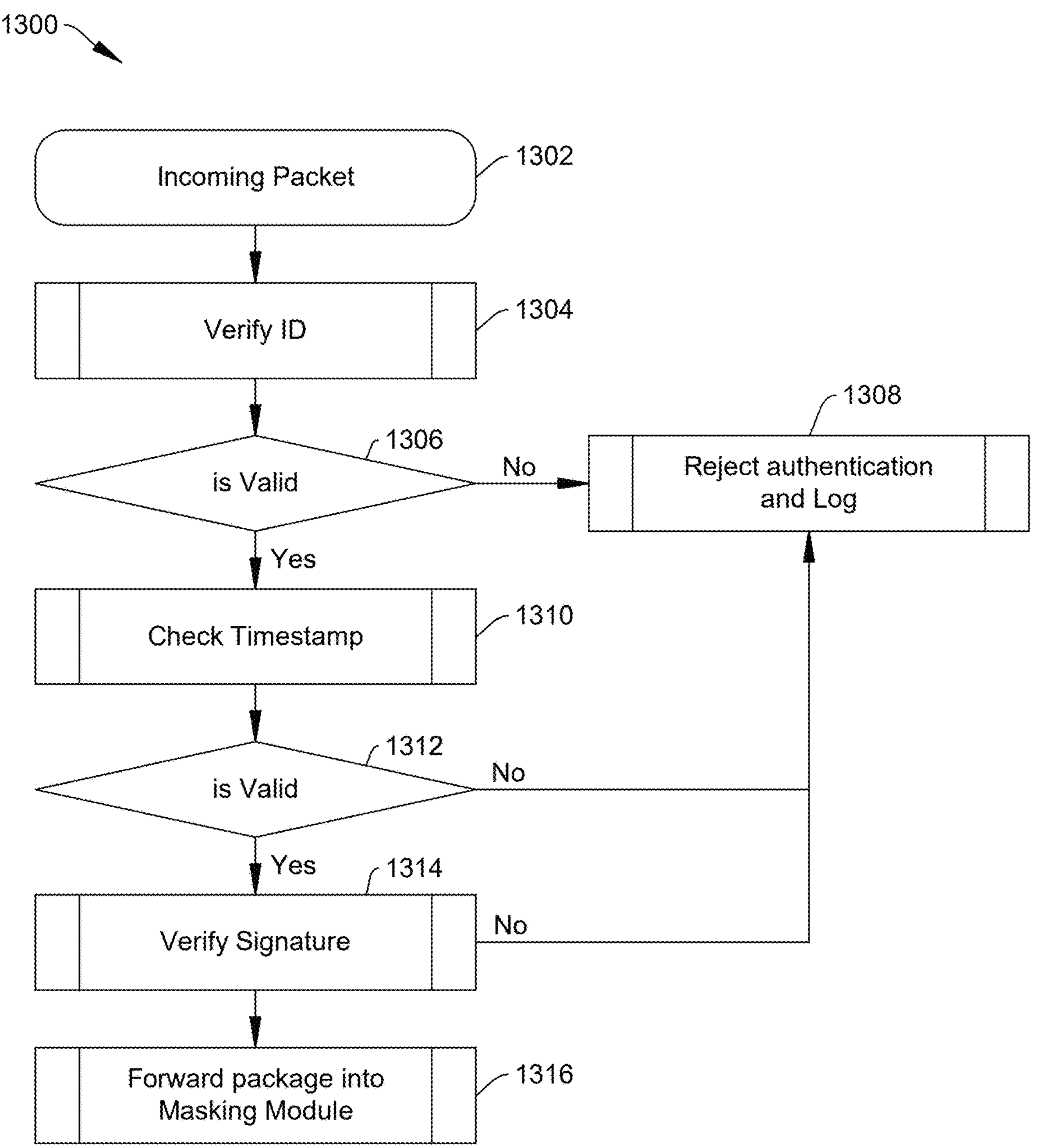
FIG. 13 illustrates a flowchart of a process for authenticating and processing incoming packets in a remote activation system.

Referring to FIG. 13, a process 1300 illustrates a multi-layered authentication approach for validating incoming packets within the remote activation system of the cellular telephone 100. The process 1300 may provide comprehensive security verification that protects the reserved battery capacity from unauthorized access attempts while ensuring that legitimate activation requests from trusted contacts can successfully trigger emergency functionality.

The process 1300 may commence at a step 1302 where an incoming packet is received by the authentication module 904. At the step 1302, the authentication module 904 may receive activation signals that have been processed by the communication module 902 and validated for structural integrity through the step 1206. The incoming packet may contain structured data packages with JSON-like payloads that include fields for trusted contact identification, timestamp information, cryptographic signatures, and command type specifications. The step 1302 may initiate the authentication sequence by accepting the incoming packet and preparing the packet data for systematic verification through multiple security layers.

Following packet reception, the process 1300 may proceed to a step 1304 where identity verification operations are performed. At the step 1304, the authentication module 904 may extract the trusted contact identification information from the incoming packet and may compare this identification against a pre-authorized contact list stored in the memory 140. The pre-authorized contact list may contain unique cryptographic identifiers for each trusted contact that has been granted authorization to trigger emergency functionality remotely. The step 1304 may verify that the contact identification present in the incoming packet corresponds to an entry in the pre-authorized contact list, ensuring that activation requests originate only from contacts that have been explicitly authorized by the user or system administrator.

The identity verification at the step 1304 may implement cryptographic contact validation using the unique identifiers stored in the pre-authorized contact list. Each trusted contact may be associated with specific cryptographic keys and identification parameters that enable the authentication module 904 to verify the authenticity of the contact identity claimed in the incoming packet. The step 1304 may perform comparison operations between the contact identification data in the incoming packet and the stored cryptographic identifiers to determine whether the claimed identity matches an authorized contact entry.

Following identity verification, the process 1300 may advance to a step 1306 which determines whether the identity verification was successful. At the step 1306, the authentication module 904 may evaluate the results of the identity verification performed at the step 1304 to determine whether the incoming packet contains valid contact identification that corresponds to an entry in the pre-authorized contact list. The step 1306 may implement conditional flow logic that directs the authentication process based on the success or failure of identity verification operations.

When identity verification fails at the step 1306, indicating that the contact identification in the incoming packet does not correspond to an authorized contact, the process 1300 may proceed to a step 1308 where authentication is rejected and the event is logged. At the step 1308, the authentication module 904 may terminate the authentication process for the current packet and may record the failed authentication attempt in security logs stored in the memory 140. The step 1308 may capture relevant information about the unauthorized access attempt, including the source of the packet, the claimed contact identity, timestamp information, and the specific reason for authentication failure, creating an audit trail for security monitoring purposes.

When identity verification succeeds at the step 1306, indicating that the contact identification corresponds to a valid entry in the pre-authorized contact list, the process 1300 may continue to a step 1310 where timestamp checking operations are performed. At the step 1310, the authentication module 904 may extract timestamp information from the incoming packet and may compare the timestamp against the current system time to determine the age of the activation request. The step 1310 may implement replay attack protection by evaluating whether the timestamp indicates that the packet was generated within an acceptable time window for processing.

The timestamp checking at the step 1310 may implement replay protection mechanisms that reject packets more than 60 seconds old, preventing attackers from intercepting and retransmitting previously valid activation signals to gain unauthorized access to the reserved battery capacity. The authentication module 904 may calculate the time difference between the packet timestamp and the current system time, comparing this difference against the predetermined maximum age threshold to determine whether the packet represents a current activation request or a potentially replayed signal from a previous transmission.

Following timestamp checking, the process 1300 may advance to a step 1312 which evaluates whether the timestamp validation was successful. At the step 1312, the authentication module 904 may determine whether the timestamp information in the incoming packet indicates that the activation request was generated within the acceptable time window for processing. The step 1312 may implement conditional flow logic that continues authentication processing for packets with valid timestamps while rejecting packets that exceed the maximum age threshold.

When timestamp validation fails at the step 1312, indicating that the packet is older than the maximum acceptable age or contains invalid timestamp information, the process 1300 may return to the step 1308 where authentication is rejected and the event is logged. The step 1308 may record the timestamp validation failure in security logs, capturing information about the packet age, timestamp values, and the specific timing parameters that caused the validation failure. This logging may provide security monitoring capabilities that can detect potential replay attack attempts or system clock synchronization issues that might affect authentication operations.

When timestamp validation succeeds at the step 1312, indicating that the packet was generated within the acceptable time window, the process 1300 may proceed to a step 1314 where signature verification operations are performed. At the step 1314, the authentication module 904 may extract the cryptographic signature from the incoming packet and may validate the signature using stored authentication keys associated with the verified contact identity. The step 1314 may implement cryptographic verification using HMAC-signed payloads with AES-256 keys to ensure message integrity and to confirm that the activation request has not been modified during transmission.

The signature verification at the step 1314 may validate the cryptographic signature against the packet payload using the appropriate cryptographic keys retrieved from the pre-authorized contact list based on the verified contact identity. The authentication module 904 may perform HMAC signature validation to verify that the packet contents match the cryptographic signature, confirming that the packet has not been tampered with during transmission and that the packet was generated using the correct cryptographic keys associated with the authorized contact.

As shown in FIG. 13, when signature verification fails at the step 1314, indicating that the cryptographic signature does not match the packet contents or was not generated using the correct authentication keys, the process 1300 may return to the step 1308 where authentication is rejected and the event is logged. The step 1308 may record the signature verification failure in security logs, capturing information about the signature validation process, the cryptographic parameters used, and the specific reasons for signature verification failure.

When signature verification succeeds at the step 1314, indicating that the cryptographic signature is valid and confirms the integrity and authenticity of the activation request, the process 1300 may advance to a step 1316 where the authenticated package is forwarded to the masking module 195. At the step 1316, the authentication module 904 may transmit the successfully authenticated activation request to the masking module 195 for further processing, enabling the transition from the pre-activation state to the unlocked state where the reserved battery capacity becomes accessible for emergency operations.

The step 1316 may coordinate with the masking module 195 to initiate the reserve unlocking sequence, providing the authenticated activation data that confirms the legitimacy of the remote activation request. The masking module 195 may receive the authenticated package from the step 1316 and may begin the process of ceasing masking operations to reveal the reserved battery capacity to system components, enabling the emergency communication module 910 to execute emergency protocols using the unlocked battery reserve.

The multi-layered authentication approach demonstrated by the process 1300 may provide comprehensive security verification that validates identity, timestamp, and cryptographic signature information before allowing access to the reserved battery capacity. The sequential verification stages may ensure that activation requests must successfully pass all authentication checks before proceeding to reserve unlocking operations, preventing unauthorized access attempts while maintaining reliable availability of emergency functionality for legitimate activation requests from trusted contacts. The structured approach to authentication processing may accommodate the diverse communication channels supported by the remote activation system while maintaining consistent security standards across all activation pathways.

Figure 14:
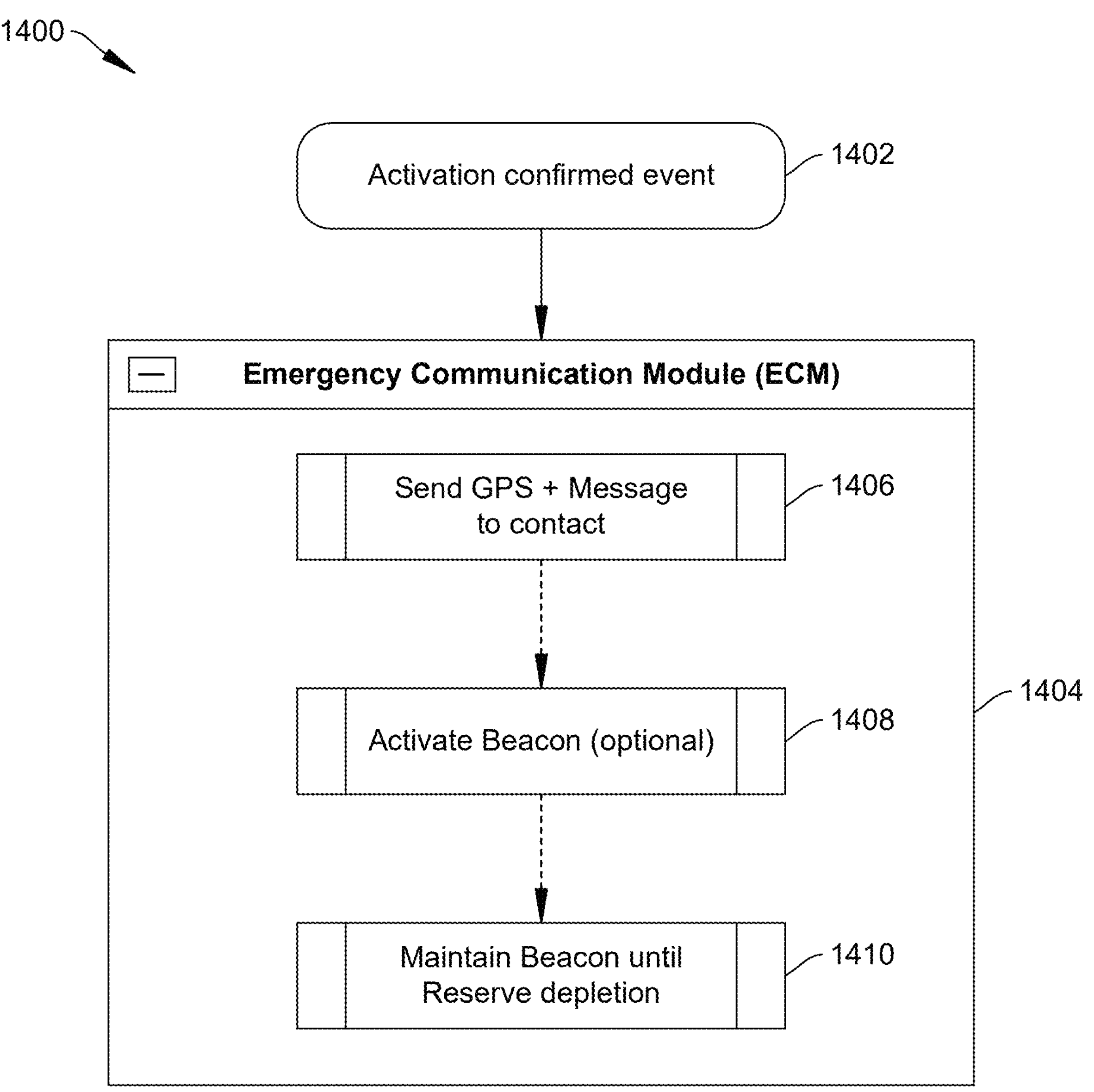
FIG. 14 presents a flowchart of the emergency communication process within an emergency communication module.

Referring to FIG. 14, a process 1400 illustrates emergency communication operations within an emergency communication module (ECM) 1404 that executes coordinated emergency response protocols once activation has been confirmed through the authentication process. The process 1400 may demonstrate the systematic execution of emergency operations that utilize the unlocked battery reserve capacity to facilitate rescue or assistance efforts, ensuring that emergency communications are transmitted effectively to designated contacts and emergency services.

The process 1400 may commence at a step 1402 where an activation confirmed event is received by the ECM 1404. At the step 1402, the ECM 1404 may receive confirmation signals from the authentication module 904 indicating that an activation request has successfully passed all authentication verification stages, including identity verification, timestamp validation, and cryptographic signature verification. The step 1402 may represent the transition point where the system moves from authentication processing to active emergency response execution, enabling the ECM 1404 to access the unlocked battery reserve capacity for emergency operations.

The activation confirmed event at the step 1402 may contain authentication data and activation parameters that specify the type of emergency response requested and the contact information for designated recipients of emergency communications. The ECM 1404 may receive this confirmation data and may prepare to execute the appropriate emergency response protocols based on the activation parameters and the emergency contact information stored in the memory 140. The step 1402 may coordinate with the battery management module 908 to ensure that the reserved battery capacity is available for emergency operations and may initialize communication interfaces required for emergency message transmission.

Following the activation confirmed event, the process 1400 may proceed to a step 1406 where the ECM 1404 sends GPS coordinates and a message to designated contacts. At the step 1406, the ECM 1404 may access GPS functionality within the cellular telephone 100 to determine the current location coordinates and may retrieve emergency contact information from the memory 140 to identify the recipients for emergency communications. The step 1406 may implement location-based emergency response by transmitting precise geographical coordinates that enable emergency responders or designated contacts to locate the device and provide appropriate assistance.

The GPS coordinate transmission at the step 1406 may utilize available communication channels to deliver location information to multiple designated contacts simultaneously, maximizing the likelihood that emergency assistance can be coordinated effectively. The ECM 1404 may format location data in standardized coordinate systems that can be readily interpreted by emergency services and mapping applications used by designated contacts. The step 1406 may also include transmission of predefined emergency messages that provide context about the emergency situation and instructions for emergency contacts regarding appropriate response actions.

The message transmission operations at the step 1406 may access emergency message templates stored in the memory 140 that contain predefined distress communications tailored to different types of emergency scenarios. The ECM 1404 may select appropriate message content based on the activation parameters received at the step 1402 and may customize the messages with current location data, time-stamp information, and device identification details. The step 1406 may utilize multiple communication pathways including SMS messaging, email transmission, and internet-based messaging services to ensure that emergency communications reach designated contacts through redundant delivery mechanisms.

Following the GPS coordinate and message transmission, the process 1400 may advance to a step 1408 where a beacon is optionally activated. The step 1408 may be indicated with a dashed line connection in FIG. 14, representing that beacon activation represents an optional operation that may be configured based on user preferences, emergency scenario requirements, or available battery capacity considerations. At the step 1408, ECM 1404 may initiate beacon transmission functionality that provides continuous or periodic location signals to facilitate device tracking by rescue personnel or emergency responders.

The beacon activation at the step 1408 may implement low-power communication protocols that balance signal detectability with battery conservation to maximize the duration of beacon operation using the available reserve capacity. The ECM 1404 may configure beacon transmission parameters including signal frequency, transmission power levels, and payload content to optimize the beacon effectiveness for the specific emergency scenario and available communication infrastructure. The step 1408 may utilize various communication technologies including cellular data transmission, Wi-Fi connectivity, Bluetooth broadcasting, or satellite communication links depending on the available communication options and the geographical location of the device.

The optional nature of the step 1408 may enable the ECM 1404 to adapt emergency response operations based on battery capacity availability, communication infrastructure conditions, and user-configured emergency response preferences. When sufficient battery reserve capacity is available and communication infrastructure supports beacon transmission, the step 1408 may enhance emergency response effectiveness by providing continuous location tracking capabilities. When battery capacity is limited or communication infrastructure is compromised, the ECM 1404 may prioritize other emergency operations such as direct communication with emergency services or designated contacts.

Following the optional beacon activation, the process 1400 may continue to a step 1410 where the beacon is maintained until reserve depletion occurs. At the step 1410, the ECM 1404 may sustain beacon transmission operations using the available reserve battery capacity, continuing location signal transmission until the reserved power becomes insufficient to support further beacon operations. The step 1410 may implement adaptive power management that adjusts beacon transmission parameters based on remaining battery capacity to maximize the duration of beacon operation while maintaining signal detectability.

The beacon maintenance at the step 1410 may incorporate dynamic transmission scheduling that adapts beacon frequency and payload size based on battery level monitoring to extend operational duration. The ECM 1404 may implement power-efficient beacon protocols that reduce transmission frequency as battery capacity decreases while maintaining sufficient signal transmission to enable location tracking by rescue personnel. The step 1410 may coordinate with the battery management module 908 to monitor remaining reserve capacity and may adjust beacon operations accordingly to ensure optimal utilization of available emergency power.

The step 1410 may continue beacon transmission until the battery detector 130 indicates that the reserve capacity has reached depletion levels that cannot support further communication operations. The ECM 1404 may implement graceful shutdown procedures that prioritize final location transmissions and status updates to designated contacts before terminating beacon operations due to power depletion. The step 1410 may ensure that the maximum possible duration of emergency communication capability is achieved using the available reserve battery capacity.

The process 1400 may provide systematic emergency response execution that coordinates multiple communication operations to maximize the effectiveness of emergency assistance efforts. The sequential progression from activation confirmation through GPS coordinate transmission, optional beacon activation, and sustained beacon maintenance may ensure that emergency communications are delivered effectively while optimizing the utilization of reserved battery capacity. The ECM 1404 may execute these operations independently of the main operating system 200, ensuring that emergency functionality remains operational even when regular device functions have been disabled due to apparent battery depletion.

The coordinated emergency response demonstrated by the process 1400 may facilitate rescue or assistance efforts by providing multiple communication mechanisms that accommodate different emergency response scenarios and communication infrastructure conditions. The combination of immediate location and message transmission with sustained beacon operation may ensure that emergency contacts and rescue personnel receive both initial emergency notification and ongoing location tracking capabilities that enable effective coordination of emergency assistance efforts.

Figure 15:
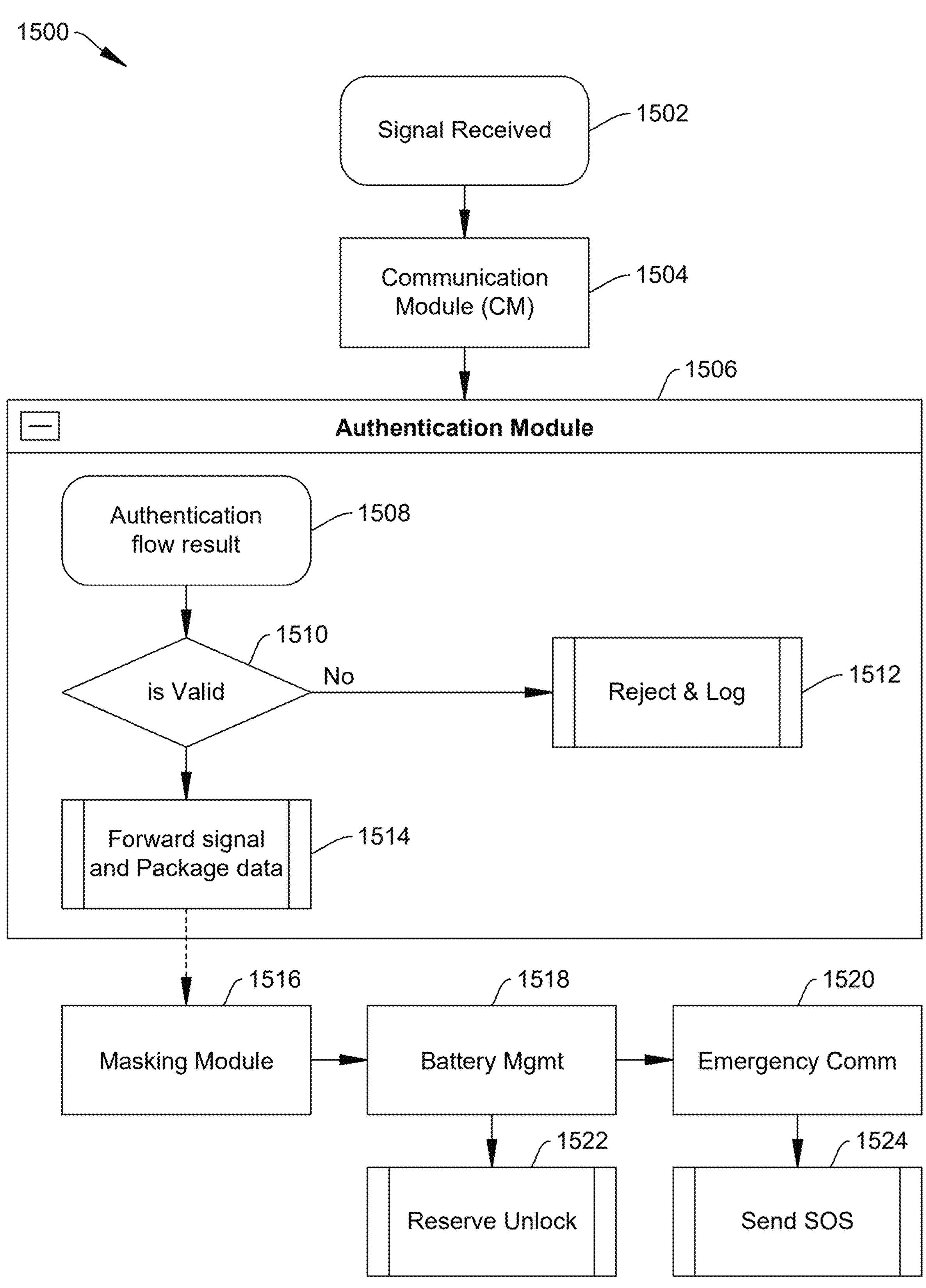
FIG. 15 depicts a flowchart of the full signal flow through authentication for remote activation.

Referring to FIG. 15, a process 1500 depicts the complete signal flow from reception through authentication to reserve unlocking and emergency response execution for the remote activation system of the cellular telephone 100. The process 1500 may illustrate the comprehensive sequence of operations that enables remote activation signals to progress through systematic validation stages before triggering emergency functionality, ensuring that the reserved battery capacity becomes accessible only when legitimate activation requests are properly authenticated and processed.

The process 1500 may commence at a step 1502 where a signal is received by a communication module 1504. At the step 1502, the communication module 1504 may receive incoming activation signals through any of the supported communication channels including satellite communication links, encrypted SMS messages, cloud-based server requests via HTTPS connections, or local wireless connections such as Bluetooth LE or Wi-Fi Direct. The communication module 1504 may correspond to the communication module 902 described in the system 900 and may implement initial signal processing operations including signal demodulation, protocol-specific decoding, and format normalization to prepare activation signals for subsequent authentication processing.

The signal reception at the step 1502 may accommodate diverse activation scenarios where trusted contacts, emergency services, or authorized applications attempt to trigger emergency functionality remotely when users may be unable to manually activate emergency operations. The communication module 1504 may maintain operational readiness to receive activation signals even when the device appears completely depleted due to masking operations, ensuring that remote activation capabilities remain available throughout the Emergency Power Reserve State. The step 1502 may initiate the complete signal processing sequence by accepting incoming activation signals and preparing the signals for systematic validation through multiple processing stages.

Following signal reception, the communication module 1504 may forward the processed activation signal to an authentication module 1506 for validation operations. The authentication module 1506 may correspond to the authentication module 904 described in the system 900 and may implement comprehensive authentication verification processes to confirm the legitimacy of activation requests. The communication module 1504 may transmit the normalized activation signal data to the authentication module 1506 through secure internal communication pathways that maintain signal integrity during the transfer between processing modules.

The authentication module 1506 may receive the activation signal from the communication module 1504 and may initiate multi-layered authentication mechanisms including identity verification against pre-authorized contact lists stored in the memory 140, cryptographic signature validation using stored authentication keys, and timestamp verification to prevent replay attacks. The authentication module 1506 may access the pre-authorized contact list to verify that the activation request originates from a trusted contact with appropriate authorization to trigger emergency functionality, implementing the comprehensive authentication approach described in the process 1300.

Following authentication processing by the authentication module 1506, the process 1500 may advance to a step 1508 where authentication flow result processing occurs. At the step 1508, the authentication module 1506 may evaluate the results of the multi-layered authentication verification performed on the received activation signal, determining whether the signal has successfully passed all required authentication checks including identity verification, timestamp validation, and cryptographic signature verification. The step 1508 may consolidate the authentication results from multiple verification stages to produce a definitive determination regarding the legitimacy of the activation request.

The authentication flow result processing at the step 1508 may coordinate the evaluation of authentication outcomes from the various verification layers implemented by the authentication module 1506. The step 1508 may assess whether the contact identification corresponds to an entry in the pre-authorized contact list, whether the timestamp indicates that the activation request was generated within the acceptable time window, and whether the cryptographic signature validates the integrity and authenticity of the activation request. The step 1508 may produce a consolidated authentication result that indicates either successful validation or identification of specific authentication failures that prevent activation from proceeding.

The process 1500 may continue to a step 1510 where a determination is made regarding whether the signal validation was successful. At the step 1510, the system may evaluate the authentication results produced at the step 1508 to determine whether the activation signal has met all authentication requirements for proceeding to reserve unlocking operations. The step 1510 may implement conditional flow logic that directs the process based on the success or failure of the comprehensive authentication verification performed by the authentication module 1506.

The validation determination at the step 1510 may serve as the decision point that controls access to the reserved battery capacity based on authentication outcomes. The step 1510 may ensure that only activation signals that have successfully passed all authentication verification stages can proceed to reserve unlocking operations, while signals that fail any aspect of authentication verification are rejected and logged for security monitoring purposes. The conditional logic at the step 1510 may maintain the security integrity of the remote activation system by preventing unauthorized access attempts from progressing beyond the authentication stage.

When the validation determination at the step 1510 indicates that authentication has failed, the process 1500 may proceed to a step 1512 where the signal is rejected and the authentication failure is logged. At the step 1512, the authentication module 1506 may terminate processing of the current activation signal and may record the failed authentication attempt in security logs stored in the memory 140. The step 1512 may capture comprehensive information about the unauthorized access attempt, including the source communication channel, claimed contact identity, timestamp information, authentication failure reasons, and any other relevant data that may be useful for security monitoring and analysis purposes.

The rejection and logging operations at the step 1512 may provide security audit capabilities that enable monitoring of unauthorized access attempts and detection of potential security threats to the remote activation system. The step 1512 may implement structured logging that records authentication failures in a format suitable for security analysis, enabling identification of patterns in unauthorized access attempts that might indicate coordinated attacks or system vulnerabilities. Following the logging operations, the step 1512 may return the system to the normal monitoring state where the communication module 1504 continues to monitor for incoming activation signals while the reserved battery capacity remains protected through continued masking operations.

When the validation determination at the step 1510 indicates that authentication has succeeded, the process 1500 may proceed to a step 1514 where the validated signal and package data are forwarded for further processing. At the step 1514, the authentication module 1506 may transmit the successfully authenticated activation request along with associated authentication data to subsequent processing modules that implement reserve unlocking and emergency response operations. The step 1514 may coordinate the transition from authentication processing to active emergency functionality execution, enabling the authenticated activation signal to trigger the sequence of operations that unlock the reserved battery capacity and initiate emergency communications.

The forwarding operations at the step 1514 may include transmission of authentication confirmation data that verifies the legitimacy of the activation request and provides authorization for subsequent modules to access the reserved battery capacity. The step 1514 may coordinate with multiple processing modules simultaneously to ensure coordinated execution of reserve unlocking and emergency response operations, enabling parallel processing of different aspects of the emergency activation sequence to minimize response time and maximize the effectiveness of emergency functionality.

As shown in FIG. 15, the forwarded data from the step 1514 may be processed by a masking module 1516, which receives the authenticated activation signal and begins the process of ceasing masking operations to reveal the reserved battery capacity. The masking module 1516 may correspond to the masking module 195 described in previous embodiments and may implement the transition from the pre-activation state to the unlocked state where the battery reserve becomes accessible for emergency operations. The masking module 1516 may coordinate with other system components to ensure that the transition from masked to unmasked battery reporting occurs smoothly and that system components receive accurate battery status information once the reserve becomes available.

The masking module 1516 may communicate with a battery management module 1518 to coordinate the unlocking of the reserved battery capacity and the updating of internal capacity mapping. The battery management module 1518 may correspond to the battery management module 908 described in the system 900 and may implement the core functionality for managing the division of total battery capacity between main and reserve portions. The battery management module 1518 may receive coordination signals from the masking module 1516 and may execute reserve unlocking operations by updating the reserve table 1008 and coordinating with the power HAL 1004 to notify system components of the newly available battery capacity.

The battery management module 1518 may interact with an emergency communication module 1520 to enable emergency response operations using the unlocked battery reserve capacity. The emergency communication module 1520 may correspond to the emergency communication module 910 described in the system 900 and may implement comprehensive emergency response protocols including location transmission, message delivery, and beacon activation. The battery management module 1518 may provide power allocation coordination to the emergency communication module 1520, ensuring that the unlocked reserve capacity is available for emergency operations while maintaining appropriate power management throughout the emergency response sequence.

The emergency communication module 1520 may execute parallel emergency operations to maximize the effectiveness of the emergency response while efficiently utilizing the available reserve battery capacity. The process 1500 may demonstrate this parallel execution through two simultaneous operations performed by the emergency communication module 1520: reserve unlock functionality and SOS message transmission that occur concurrently to provide comprehensive emergency response capabilities.

At a step 1522, the emergency communication module 1520 may execute reserve unlock functionality that ensures the reserved battery capacity becomes fully accessible for emergency operations. The step 1522 may coordinate with the battery management module 1518 to complete the reserve unlocking sequence, verifying that system components can access the previously masked battery capacity and that power distribution systems are configured to support emergency operations. The step 1522 may implement final verification procedures that confirm the successful transition from masked reserve state to active emergency power state, ensuring that emergency functionality has reliable access to the reserved battery capacity.

Simultaneously, at a step 1524, the emergency communication module 1520 may execute SOS message transmission operations that deliver emergency communications to designated contacts and emergency services. The step 1524 may implement comprehensive emergency messaging that includes transmission of current GPS location coordinates, predefined distress messages, device identification information, and timestamp data to multiple designated contacts through available communication channels. The step 1524 may coordinate with the communication module 1504 to utilize available communication pathways for emergency message delivery, ensuring that emergency communications reach intended recipients through redundant transmission mechanisms.

The parallel execution of the step 1522 and the step 1524 may demonstrate the coordinated emergency response capabilities that utilize the unlocked battery reserve capacity to provide both power access verification and immediate emergency communication delivery. The emergency communication module 1520 may coordinate these parallel operations to ensure that emergency functionality becomes fully operational while emergency communications are transmitted without delay, maximizing the effectiveness of the remote activation response sequence.

The complete signal flow demonstrated by the process 1500 may provide systematic validation and execution for remote activation that ensures security, reliability, and effectiveness throughout the activation sequence. The sequential progression from signal reception through authentication validation to reserve unlocking and emergency response execution may accommodate diverse remote activation scenarios while maintaining consistent security standards and operational reliability. The process 1500 may enable trusted contacts, emergency services, and authorized applications to trigger emergency functionality remotely while preventing unauthorized access to the reserved battery capacity through comprehensive authentication verification and secure processing workflows.

Figure 16:
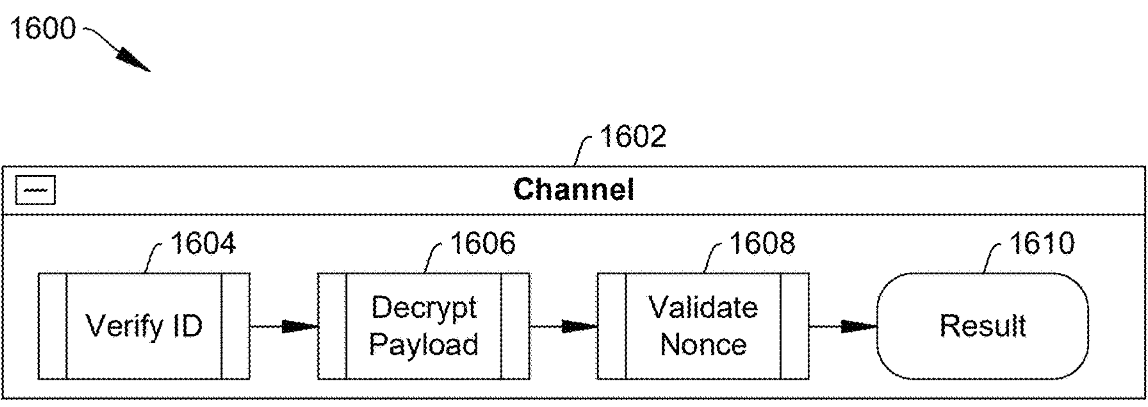
FIG. 16 illustrates a flowchart of a process operating within a communication channel.
Figure 17:
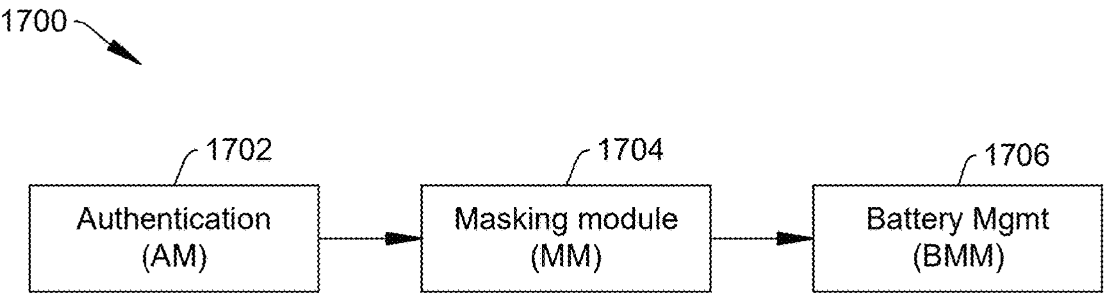
FIG. 17 presents a flowchart showing a sequence of module interactions.
Figure 18:
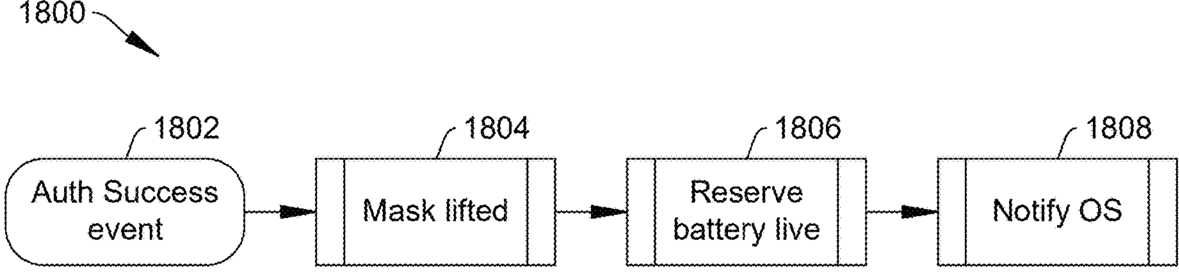
FIG. 18 depicts a flowchart of an event-driven sequence for reserve battery activation.

Referring to FIG. 16, FIG. 17, and FIG. 18, channel-specific processing and module interaction sequences demonstrate the systematic workflows that enable the remote activation system to process incoming signals through verification, decryption, and validation stages while coordinating module interactions for reserve battery activation. These processes may provide specialized handling for different communication channels while maintaining consistent security standards and operational reliability throughout the activation sequence.

Referring to FIG. 16, a process 1600 operates within a channel 1602 to implement sequential authentication and decryption workflow for processing incoming activation signals. The process 1600 may provide channel-specific processing capabilities that accommodate the different security requirements and data formats associated with various communication pathways supported by the remote activation system. The channel 1602 may represent any of the supported communication channels including satellite communication links, SMS messaging, cloud-based server communications, or local wireless connections such as Bluetooth LE or Wi-Fi Direct.

The process 1600 may commence at a step 1604 where identifier verification operations are performed on incoming activation signals received through the channel 1602. At the step 1604, the system may extract contact identification information from the activation signal and may verify that the identifier corresponds to an entry in the pre-authorized contact list stored in the memory 140. The step 1604 may implement the initial security verification that ensures activation requests originate from authorized sources before proceeding to payload processing operations. The identifier verification may utilize cryptographic contact validation mechanisms that compare the extracted identification data against stored cryptographic identifiers for each trusted contact.

Following successful identifier verification, the process 1600 may proceed to a step 1606 where payload decryption operations are executed. At the step 1606, the system may decrypt the encrypted payload data contained within the activation signal using cryptographic keys associated with the verified contact identifier. The step 1606 may implement channel-specific decryption procedures that accommodate the different encryption methods and data formats used by various communication channels. For satellite activation signals, the step 1606 may decrypt minimal payload data from signed ping packets, while for SMS activation signals, the step 1606 may decrypt more comprehensive payload data containing encrypted nonce values and command parameters.

The payload decryption at the step 1606 may utilize AES-256 encryption keys stored in association with each trusted contact entry in the pre-authorized contact list. The system may retrieve the appropriate decryption key based on the verified contact identifier from the step 1604 and may apply the decryption algorithm to extract the plaintext payload data from the encrypted activation signal. The step 1606 may validate the decryption results to ensure that the payload data has been successfully decrypted and contains the expected data structures for subsequent validation operations.

Following payload decryption, the process 1600 may advance to a step 1608 where nonce validation operations are performed to ensure message freshness and prevent replay attacks. At the step 1608, the system may extract nonce values from the decrypted payload data and may validate these values against stored nonce records to verify that the activation signal represents a current request rather than a replayed transmission from a previous activation attempt. The step 1608 may implement replay protection mechanisms that maintain records of previously used nonce values and reject activation signals that contain nonce values that have been used in prior activation attempts.

The nonce validation at the step 1608 may coordinate with timestamp verification mechanisms to provide comprehensive replay attack protection. The system may evaluate both the nonce uniqueness and the timestamp freshness to ensure that activation signals represent legitimate current requests from authorized contacts. The step 1608 may maintain nonce validation records for a predetermined time period to enable detection of replay attempts while managing storage requirements for nonce tracking data.

After successful nonce validation, the process 1600 may proceed to a step 1610 where result generation operations produce authentication outcomes for the processed activation signal. At the step 1610, the system may consolidate the results from identifier verification, payload decryption, and nonce validation to generate a definitive authentication result that indicates whether the activation signal has successfully passed all channel-specific verification requirements. The step 1610 may produce structured result data that includes authentication status, contact identification information, and any relevant processing parameters that may be required for subsequent module interactions.

The result generation at the step 1610 may format authentication outcomes in a standardized format that can be processed by subsequent modules in the activation sequence regardless of the specific communication channel used for signal reception. The step 1610 may normalize the authentication results to provide consistent interfaces for module interactions while preserving channel-specific information that may be relevant for emergency response operations or security logging purposes.

With continued reference to FIG. 17, a process 1700 illustrates coordinated module interactions that execute the sequence of operations required to transition from authenticated activation signals to active emergency functionality. The process 1700 may demonstrate the systematic coordination between different system modules that implement reserve unlocking and emergency response capabilities following successful authentication of remote activation requests.

The process 1700 may begin at a step 1702 where the authentication module 904 performs authentication operations on incoming activation signals. At the step 1702, the authentication module 904 may execute the comprehensive authentication verification processes including the channel-specific processing demonstrated by the process 1600, identity verification against pre-authorized contact lists, cryptographic signature validation, and timestamp verification. The step 1702 may coordinate the multi-layered authentication mechanisms to produce definitive authentication results that determine whether activation requests are authorized to proceed to reserve unlocking operations.

The authentication operations at the step 1702 may incorporate the channel-specific processing capabilities that accommodate different communication pathways while maintaining consistent security standards. The authentication module 904 may implement specialized processing rules for satellite ping packets that validate minimal authentication data within the constraints of satellite communication bandwidth limitations. For SMS encrypted payloads, the authentication module 904 may process more comprehensive authentication data including encrypted nonce values and extended command parameters. For Bluetooth challenge-response exchanges, the authentication module 904 may execute interactive authentication protocols that provide secure verification through local wireless communication channels.

Upon successful completion of authentication operations, the process 1700 may proceed to a step 1704 where the masking module 195 performs masking operations to transition from concealed reserve state to accessible emergency power state. At the step 1704, the masking module 195 may receive authentication confirmation from the authentication module 904 and may initiate the process of ceasing masking operations that have concealed the reserved battery capacity from system components. The step 1704 may coordinate the transition from the pre-activation state to the unlocked state, enabling system components to access the previously masked battery reserve capacity.

The masking operations at the step 1704 may involve coordination with the battery management module 1006 to update internal capacity mapping and to modify the battery status information reported to the power HAL 1004 and subsequently to the OS Layer 1002. The masking module 195 may cease transmission of modified battery level values that indicated complete depletion and may begin reporting the actual available battery capacity that includes the previously concealed reserve portion. The step 1704 may ensure that the transition from masked to unmasked battery reporting occurs smoothly without disrupting system stability or emergency functionality access.

Following the masking operations, the process 1700 may advance to a step 1706 where the battery management module 908 executes battery management functions to complete the reserve unlocking sequence and enable emergency operations. At the step 1706, the battery management module 908 may coordinate with system components to ensure that the unlocked battery reserve capacity becomes fully accessible for emergency functionality while maintaining appropriate power management throughout the emergency response sequence. The step 1706 may update the reserve table 1008 to reflect the current battery allocation state and may coordinate with power distribution systems to support emergency operations.

The battery management functions at the step 1706 may include verification of reserve unlocking completion, coordination with the emergency communication module 910 to enable emergency response operations, and implementation of power management policies that optimize the utilization of the available reserve capacity for emergency functionality. The battery management module 908 may monitor the reserve capacity utilization during emergency operations and may provide power allocation coordination to ensure that emergency communications, location transmission, and beacon operations receive appropriate power resources.

As shown in FIG. 18, a process 1800 depicts the event-driven sequence for reserve battery activation that demonstrates the systematic progression from authentication success through reserve unlocking to system notification of available emergency power. The process 1800 may illustrate the coordinated sequence of events that occur following successful authentication to enable rapid transition from masked reserve state to active emergency functionality.

The process 1800 may commence at a step 1802 where an authentication success event occurs, indicating that an activation request has successfully passed all authentication verification requirements. At the step 1802, the authentication module 904 may generate an authentication success event that signals to other system components that a legitimate activation request has been validated and that reserve unlocking operations should be initiated. The step 1802 may serve as the trigger event that initiates the coordinated sequence of operations required to transition the device from Emergency Power Reserve State to active emergency functionality.

The authentication success event at the step 1802 may contain authentication data and activation parameters that specify the type of emergency response requested and provide authorization for subsequent modules to access the reserved battery capacity. The step 1802 may coordinate with multiple system components simultaneously to ensure that reserve unlocking operations proceed efficiently and that emergency functionality becomes available with minimal delay following authentication completion.

Following the authentication success event, the process 1800 may proceed to a step 1804 where mask lifting operations are performed to reveal the reserved battery capacity to system components. At the step 1804, the masking module 195 may cease the masking operations that have concealed the battery reserve from the main operating system 200 and other system components. The step 1804 may coordinate the transition from masked battery reporting to accurate capacity reporting that includes the previously concealed reserve portion, enabling system components to recognize the availability of additional battery capacity for emergency operations.

The mask lifting operations at the step 1804 may involve coordination with the battery management module 1006 to ensure that battery status information transitions smoothly from masked values indicating complete depletion to accurate values reflecting the actual available capacity including the reserve portion. The step 1804 may implement verification procedures that confirm the successful cessation of masking operations and validate that system components receive accurate battery status information following the mask lifting process.

After successful mask lifting, the process 1800 may advance to a step 1806 where reserve battery activation operations make the reserved capacity live and accessible for emergency use. At the step 1806, the battery management module 908 may complete the reserve unlocking sequence by updating internal capacity mapping, coordinating with power distribution systems, and enabling access pathways that allow emergency functionality to utilize the previously reserved battery capacity. The step 1806 may implement final verification procedures that confirm the successful activation of reserve battery access and validate that emergency operations can reliably access the unlocked capacity.

The reserve battery activation at the step 1806 may coordinate with the switch 180 to ensure that power distribution pathways are configured to support emergency operations while maintaining isolation from regular device functions that remain disabled due to the apparent battery depletion state. The step 1806 may enable the emergency subsystem 300 to access the reserved battery capacity through dedicated power pathways that bypass the main circuit 190 restrictions implemented during the Emergency Power Reserve State.

Following reserve battery activation, the process 1800 may conclude at a step 1808 where operating system notification operations inform system components of the availability of the reserve battery capacity. At the step 1808, the battery management module 908 may coordinate with the power HAL 1004 to notify relevant system components that additional battery capacity has become available for emergency operations. The step 1808 may provide system-level notification that enables emergency functionality to recognize the availability of power resources while maintaining the shutdown state of regular device functions.

The operating system notification at the step 1808 may implement selective notification procedures that inform emergency-related system components of the available battery capacity while maintaining the apparent shutdown state for regular device functions. The step 1808 may ensure that the emergency subsystem 300 receives appropriate power status information to support emergency operations while preventing regular applications and services from detecting or accessing the reserved capacity that remains dedicated exclusively to emergency functionality.

The communication module 902 may implement channel-specific processing capabilities that normalize signal formats from different communication channels while accommodating the diverse security requirements and data structures associated with various activation pathways. The communication module 902 may include specialized processing rules for satellite ping packets that handle the minimal data overhead and bandwidth constraints associated with satellite communication links. For satellite activation, the communication module 902 may process signed ping packets containing cryptographic signatures and minimal identification data, implementing efficient validation procedures that accommodate the limited data capacity of satellite communication channels.

For SMS encrypted payloads, the communication module 902 may implement processing rules that handle encrypted text message content containing authentication data, nonce values, and command parameters within the size limitations of SMS messaging protocols. The communication module 902 may extract encrypted payload data from SMS message content and may coordinate with decryption mechanisms to process the authentication information contained within the encrypted payloads. The SMS processing capabilities may accommodate various encryption formats and may provide robust authentication verification despite the constraints of text messaging protocols.

For Bluetooth challenge-response exchanges, the communication module 902 may implement interactive authentication protocols that enable secure verification through local wireless communication channels. The communication module 902 may coordinate challenge-response sequences that provide mutual authentication between the device and nearby authorized devices or emergency responders. The Bluetooth processing capabilities may implement secure pairing mechanisms and may provide reliable authentication verification through short-range wireless communication protocols that enable activation by authorized personnel in physical proximity to the device.

The channel-specific processing rules implemented by the communication module 902 may ensure that activation signals from different communication pathways undergo appropriate validation and formatting procedures while maintaining consistent security standards across all supported channels. The normalization of signal formats may enable subsequent processing modules to handle authenticated activation requests through standardized interfaces regardless of the original communication channel used for signal transmission, providing operational flexibility while maintaining security integrity throughout the remote activation system.

Figure 19:
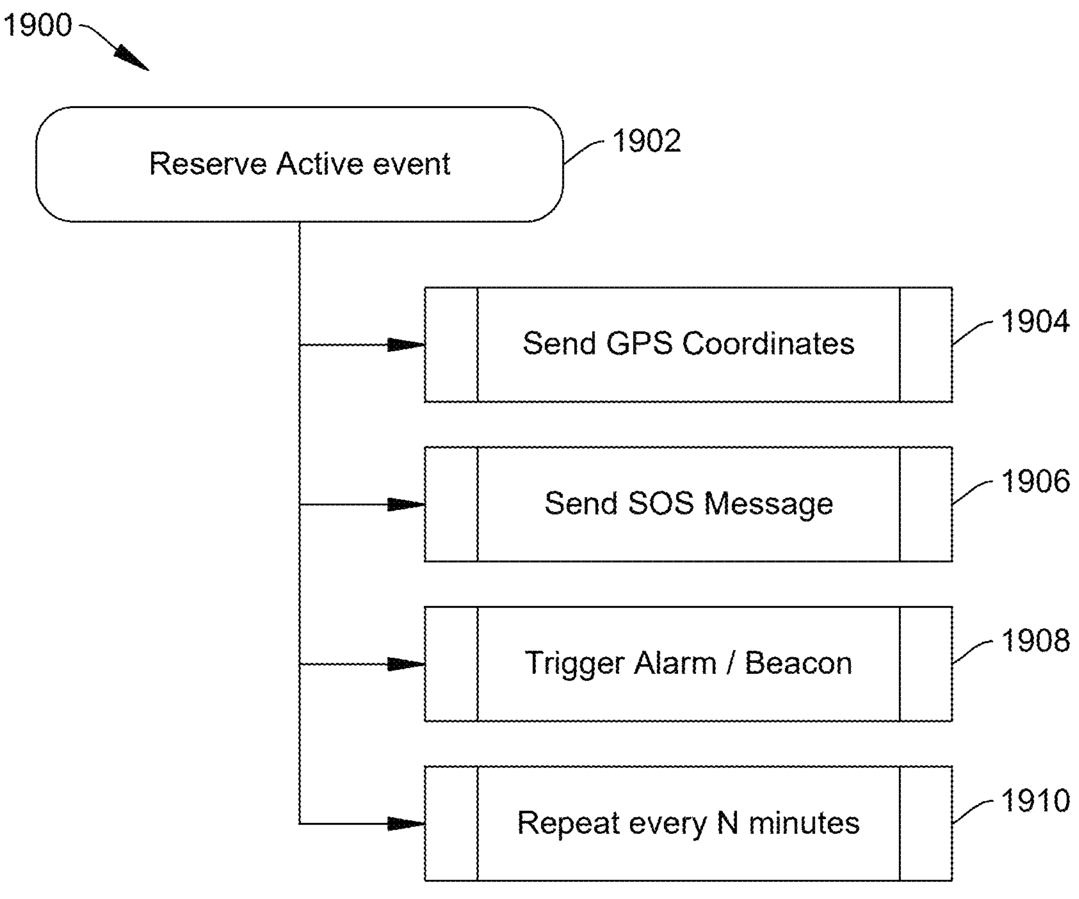
FIG. 19 illustrates a flowchart of a process for executing emergency response actions following activation of a reserve battery feature.

Referring to FIG. 19, a process 1900 illustrates an automated emergency response sequence that executes when the reserve battery feature is activated, providing systematic coordination of multiple emergency communication operations to maximize the effectiveness of emergency assistance efforts. The process 1900 may demonstrate how the emergency communication module 910 implements comprehensive emergency response protocols that utilize the unlocked battery reserve capacity to execute coordinated emergency operations including location transmission, distress messaging, alarm activation, and sustained beacon operation with adaptive power management.

The process 1900 may commence at a step 1902 where a reserve active event is detected or triggered, indicating that the device has successfully transitioned from the Emergency Power Reserve State to active emergency functionality following successful authentication of a remote activation request or manual emergency activation by the user. At the step 1902, the emergency communication module 910 may receive confirmation signals from the battery management module 908 indicating that the masked battery reserve has been unlocked and that the reserved battery capacity has become accessible for emergency operations. The step 1902 may serve as the initiation trigger for the automated emergency response sequence, coordinating the systematic execution of multiple emergency communication operations that maximize the likelihood of successful emergency assistance coordination.

The reserve active event at the step 1902 may contain activation parameters and emergency contact information that specify the scope and type of emergency response operations to be executed. The emergency communication module 910 may access emergency contact lists stored in the memory 140 and may retrieve predefined emergency message templates that provide appropriate distress communications for the current emergency scenario. The step 1902 may coordinate with various system components including GPS functionality, communication interfaces, and the alarm generator 170 to ensure that all required resources are available for comprehensive emergency response execution.

Following the reserve active event detection, the process 1900 may proceed to a step 1904 where the emergency communication module 910 sends GPS coordinates to designated emergency contacts or services, providing precise location information to facilitate emergency response coordination. At the step 1904, the emergency communication module 910 may access GPS functionality within the cellular telephone 100 to determine current location coordinates with maximum available precision and may format the location data in standardized coordinate systems that can be readily interpreted by emergency services and mapping applications used by designated contacts. The step 1904 may implement multi-path emergency dispatch capabilities that automatically transmit GPS coordinates simultaneously across multiple communication paths including SMS messaging, email transmission, cloud-based messaging services, and any available internet connectivity to ensure redundant delivery of location information.

The GPS coordinate transmission at the step 1904 may include comprehensive location data containing latitude and longitude coordinates, altitude information where available, coordinate system specifications, timestamp data indicating when the location was determined, and accuracy estimates that provide emergency responders with information about the precision of the transmitted location data. The emergency communication module 910 may format location information in multiple standard formats including decimal degrees, degrees-minutes-seconds, and Universal Transverse Mercator coordinates to accommodate different emergency response systems and mapping applications that may be used by designated contacts.

The multi-path emergency dispatch functionality at the step 1904 may automatically select and utilize available communication channels based on current connectivity conditions and communication infrastructure availability. The emergency communication module 910 may prioritize communication channels based on reliability, delivery confirmation capabilities, and transmission speed to ensure that location information reaches designated contacts through the most effective available pathways. The step 1904 may implement parallel transmission across multiple channels simultaneously to provide redundant delivery mechanisms that enhance the reliability of location information delivery even when individual communication channels may be compromised or unavailable.

The process 1900 may continue to a step 1906 where an SOS message is transmitted to designated emergency contacts, providing contextual information about the emergency situation and instructions for appropriate response actions. At the step 1906, the emergency communication module 910 may access predefined emergency message templates stored in the memory 140 and may customize the messages with current timestamp information, device identification details, and any available contextual information about the emergency activation circumstances. The step 1906 may implement comprehensive distress messaging that provides emergency contacts with sufficient information to coordinate appropriate assistance while accommodating the communication constraints that may exist during emergency scenarios.

The SOS message transmission at the step 1906 may include predefined distress communications that have been configured by the user or system administrator to provide appropriate emergency information for different types of emergency scenarios. The emergency communication module 910 may select appropriate message content based on activation parameters received during the reserve active event and may customize the messages with current location data, timestamp information, battery status information, and device identification details that enable emergency contacts to coordinate effective assistance efforts. The step 1906 may utilize the same multi-path emergency dispatch capabilities implemented at the step 1904 to ensure that SOS messages reach designated contacts through redundant communication channels.

The SOS message content at the step 1906 may provide emergency contacts with actionable information including the nature of the emergency activation, current device location, estimated battery capacity remaining for emergency operations, preferred contact methods for coordination with emergency responders, and any specific instructions or preferences that have been preconfigured for emergency response coordination. The emergency communication module 910 may format SOS messages in standardized formats that can be processed by emergency response systems and may include structured data elements that enable automated processing by emergency coordination applications.

Following SOS message transmission, the process 1900 may advance to a step 1908 where a trigger alarm or beacon is activated to provide additional emergency signaling capabilities that enhance the detectability of the device and facilitate location tracking by rescue personnel. At the step 1908, the emergency communication module 910 may coordinate with the alarm generator 170 to activate audible alarms through the speaker 172 that attract attention from nearby individuals who may be able to provide immediate assistance or coordinate with emergency responders. The step 1908 may simultaneously initiate beacon transmission functionality that provides continuous or periodic location signals through available communication channels to facilitate device tracking by rescue personnel or emergency responders.

The trigger alarm activation at the step 1908 may implement adaptive alarm patterns that balance audible signal effectiveness with battery conservation to maximize the duration of alarm operation using the available reserve capacity. The emergency communication module 910 may coordinate with the alarm generator 170 to produce alarm signals with varying intensity, frequency, and duration patterns that optimize the likelihood of attracting nearby attention while preserving battery capacity for sustained emergency operations. The step 1908 may enable users or system administrators to preconfigure alarm activation preferences that specify whether audible alarms should be activated automatically or only upon specific user confirmation to accommodate different emergency scenarios and user preferences.

The beacon activation at the step 1908 may implement adaptive beacon transmission capabilities that automatically adjust transmission frequency and payload content to preserve battery life while maintaining reliable detectability by rescue personnel and emergency response systems. The emergency communication module 910 may configure beacon transmission parameters including signal frequency, transmission power levels, payload size, and transmission intervals based on remaining battery capacity, available communication infrastructure, and emergency response requirements. The adaptive beacon transmission may implement dynamic power management that reduces transmission frequency and payload size as battery capacity decreases while maintaining sufficient signal transmission to enable location tracking throughout the emergency response period.

The beacon transmission functionality may utilize various communication technologies including cellular data transmission, Wi-Fi connectivity, Bluetooth broadcasting, or satellite communication links depending on available communication options and geographical location conditions. The emergency communication module 910 may implement beacon protocols that adapt to available communication infrastructure and may automatically switch between different communication technologies based on signal strength, connectivity reliability, and power consumption characteristics to optimize beacon effectiveness while maximizing operational duration.

The process 1900 may conclude with a step 1910 where emergency actions are repeated every N minutes to ensure ongoing transmission of emergency signals and location data at regular intervals, maintaining communication with emergency contacts and services until the reserve battery capacity becomes depleted. At the step 1910, the emergency communication module 910 may implement periodic repetition of GPS coordinate transmission, SOS message delivery, and beacon signal transmission to provide sustained emergency communication capabilities that accommodate the extended duration that may be required for emergency response coordination and rescue operations.

The periodic repetition at the step 1910 may implement adaptive scheduling that adjusts the repetition interval N based on remaining battery capacity, communication infrastructure conditions, and emergency response progress to optimize the balance between communication frequency and battery conservation. The emergency communication module 910 may monitor battery capacity utilization and may dynamically adjust the repetition interval to extend the total duration of emergency communication capabilities while maintaining sufficient communication frequency to support effective emergency response coordination. The step 1910 may implement intelligent scheduling that increases repetition frequency when battery capacity is abundant and reduces repetition frequency as battery capacity decreases to maximize the total operational duration.

The repeated emergency actions at the step 1910 may include updated location information that reflects any device movement that may occur during the emergency response period, enabling emergency responders to track device location changes and adjust response coordination accordingly. The emergency communication module 910 may compare current GPS coordinates with previously transmitted location data and may provide movement tracking information that assists emergency responders in locating the device when the device location changes during the emergency response period.

The step 1910 may coordinate with the battery management module 908 to monitor remaining reserve capacity and may implement graceful degradation procedures that prioritize different emergency communication functions based on available battery capacity. When battery capacity becomes limited, the step 1910 may prioritize location transmission over other emergency functions to ensure that emergency responders receive current location information until the final stages of battery depletion. The emergency communication module 910 may implement final transmission procedures that deliver comprehensive status updates to designated contacts before terminating emergency operations due to battery depletion, ensuring that emergency contacts receive notification of communication termination and final device status information.

The automated emergency response sequence demonstrated by the process 1900 may provide comprehensive emergency communication capabilities that coordinate multiple emergency functions simultaneously while implementing adaptive power management to maximize the effectiveness and duration of emergency operations. The systematic progression through location transmission, distress messaging, alarm activation, and sustained periodic communication may ensure that emergency assistance efforts receive comprehensive information and ongoing communication support throughout the emergency response period, maximizing the likelihood of successful rescue or assistance coordination using the available reserve battery capacity.

Figure 20:
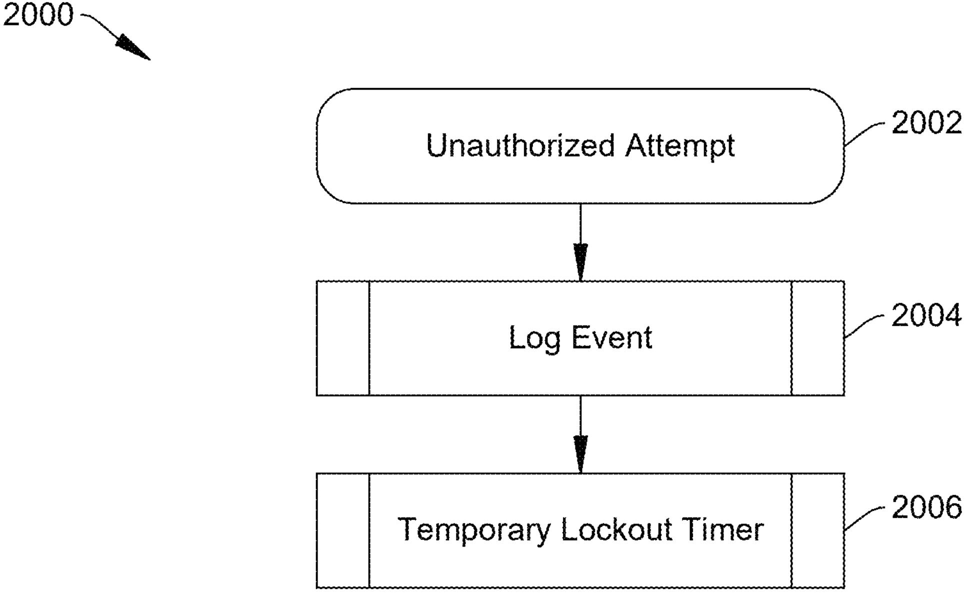
FIG. 20 presents a flowchart of a security response process triggered by an unauthorized attempt.

Referring to FIG. 20, a security response process demonstrates systematic handling of unauthorized access attempts to the reserved battery capacity, implementing multi-layered fail-safe mechanisms that protect the emergency functionality from security threats while maintaining comprehensive audit trails for security monitoring purposes. The security response process may provide structured detection, logging, and mitigation procedures that respond to unauthorized access attempts through coordinated security measures designed to preserve the integrity of the battery reserve feature.

The security response process may commence at a step 2000 where an unauthorized attempt is detected by the authentication module 904 during processing of incoming activation signals. At the step 2000, the authentication module 904 may identify activation requests that fail authentication verification requirements including invalid contact identification that does not correspond to entries in the pre-authorized contact list stored in the memory 140, expired timestamps that indicate potential replay attacks, or invalid cryptographic signatures that suggest tampering or unauthorized signal generation. The step 2000 may serve as the initial detection point where the system recognizes potential security threats and initiates appropriate security response procedures to protect the reserved battery capacity from unauthorized access.

The unauthorized attempt detection at the step 2000 may implement comprehensive threat identification capabilities that analyze multiple aspects of incoming activation signals to determine the nature and severity of potential security violations. The authentication module 904 may evaluate authentication failures across different verification layers including identity verification, timestamp validation, and cryptographic signature verification to classify unauthorized attempts based on the specific authentication requirements that were not satisfied. The step 2000 may distinguish between different types of unauthorized attempts such as unknown contact attempts where the claimed identity does not exist in the pre-authorized contact list, replay attempts where valid authentication data is retransmitted outside the acceptable time window, and tampering attempts where activation signals contain modified or corrupted authentication data.

Following unauthorized attempt detection, the security response process may proceed to a step 2002 where detailed analysis of the unauthorized attempt is performed to gather comprehensive information about the security violation for logging and monitoring purposes. At the step 2002, the authentication module 904 may extract relevant information from the failed activation attempt including the source communication channel through which the unauthorized signal was received, the claimed contact identity that failed verification, timestamp information that indicates when the unauthorized attempt occurred, and specific authentication failure details that identify which verification requirements were not satisfied. The step 2002 may coordinate with the communication module 902 to gather additional context information about the unauthorized attempt including signal strength characteristics, communication protocol details, and any available source identification information that may assist in security analysis.

The detailed analysis at the step 2002 may implement forensic data collection procedures that preserve information about unauthorized attempts in formats suitable for security analysis and threat assessment. The authentication module 904 may capture authentication failure cause codes that specify the exact reasons why authentication verification failed, enabling security monitoring systems to identify patterns in unauthorized access attempts that might indicate coordinated attacks or systematic security threats. The step 2002 may coordinate with system components to gather comprehensive context information while ensuring that the analysis procedures do not interfere with ongoing security response operations or compromise the protection of the reserved battery capacity.

The security response process may continue to a step 2004 where the unauthorized attempt is logged as a security event with comprehensive information including timestamp data, source identification, and detailed characterization of the nature of the unauthorized access attempt. At the step 2004, the authentication module 904 may record the unauthorized attempt in security logs stored in the memory 140, creating permanent audit records that document security violations and provide information for ongoing security monitoring and analysis. The step 2004 may implement structured logging procedures that organize unauthorized attempt information in standardized formats suitable for automated security analysis and manual security review procedures.

The logging operations at the step 2004 may capture comprehensive security event information including precise timestamp data that indicates when the unauthorized attempt was detected, source communication channel identification that specifies how the unauthorized signal was received, claimed contact identity information that failed verification, authentication failure cause codes that identify specific verification requirements that were not satisfied, and any additional context information that may be relevant for security analysis. The step 2004 may coordinate with the memory 140 to ensure that security logs are stored in protected memory areas that prevent unauthorized modification or deletion of security audit information.

The structured logging at the step 2004 may implement security event categorization that classifies unauthorized attempts based on threat severity, attack methodology, and potential security implications to enable prioritized security response and analysis procedures. The authentication module 904 may assign threat severity levels based on the nature of the authentication failures and the potential risk posed by different types of unauthorized access attempts. The step 2004 may implement log rotation and archival procedures that manage security log storage requirements while preserving historical security event information for long-term security trend analysis and threat assessment.

Following comprehensive logging operations, the security response process may advance to a step 2006 where a temporary lockout timer is initiated to prevent further access attempts for a specified duration, implementing proactive security measures that limit the ability of unauthorized entities to conduct repeated access attempts against the reserved battery capacity. At the step 2006, the authentication module 904 may activate lockout mechanisms that temporarily disable processing of incoming activation signals from the source that generated the unauthorized attempt, preventing rapid-fire authentication attempts that could potentially overwhelm security verification systems or enable brute-force attacks against the authentication mechanisms.

The temporary lockout timer at the step 2006 may implement adaptive lockout duration policies that adjust the lockout period based on the frequency and severity of unauthorized attempts from specific sources or across the entire system. The authentication module 904 may maintain lockout state information that tracks the number of consecutive unauthorized attempts from individual sources and may implement escalating lockout durations that increase the lockout period for sources that generate repeated unauthorized access attempts. The step 2006 may coordinate with the communication module 902 to ensure that lockout restrictions are applied appropriately to specific communication channels or source identifiers while maintaining the availability of emergency activation functionality for legitimate activation requests from authorized sources.

The lockout mechanisms implemented at the step 2006 may provide graduated security response capabilities that balance security protection with operational availability of emergency functionality. The authentication module 904 may implement source-specific lockout procedures that restrict access attempts from individual unauthorized sources while maintaining full functionality for activation requests from other sources that have not generated security violations. The step 2006 may implement system-wide lockout procedures that temporarily disable all activation processing when the frequency of unauthorized attempts exceeds predetermined threat thresholds, providing comprehensive protection against coordinated attacks while ensuring that lockout restrictions are lifted automatically after appropriate time periods.

The multi-layered fail-safe mechanisms demonstrated by the security response process may provide comprehensive protection for the reserved battery capacity through coordinated detection, logging, and mitigation procedures that respond systematically to security threats. The authentication module 904 may implement multiple independent security verification layers that must all be satisfied before activation requests can proceed to reserve unlocking operations, ensuring that unauthorized access attempts are detected and blocked at multiple points in the authentication process. The fail-safe mechanisms may include identity verification against pre-authorized contact lists, cryptographic signature validation using stored authentication keys, timestamp verification to prevent replay attacks, and nonce validation to ensure message freshness.

The temporary lockout functionality may serve as a protective mechanism that prevents repeated unauthorized access attempts from compromising the security of the battery reserve feature while maintaining the availability of emergency functionality for legitimate activation requests. The authentication module 904 may implement intelligent lockout policies that distinguish between different types of unauthorized attempts and may apply appropriate lockout restrictions based on threat assessment and security risk evaluation. The lockout mechanisms may coordinate with the communication module 902 to ensure that legitimate emergency activation requests can continue to be processed through alternative communication channels or from authorized sources that have not generated security violations.

The secure logging capabilities may provide comprehensive audit trails that document all activation attempts including both successful authentications and unauthorized access attempts, enabling security monitoring systems to detect patterns in security events and identify potential threats to the battery reserve functionality. The authentication module 904 may implement cause code logging that captures specific details about authentication failures, providing detailed information that enables security analysis systems to distinguish between different types of security threats and implement appropriate countermeasures. The logging mechanisms may coordinate with the memory 140 to ensure that security audit information is preserved in tamper-resistant storage that maintains the integrity of security records for compliance and forensic analysis purposes.

The coordinated security response procedures may ensure that the reserved battery capacity remains protected from unauthorized access while maintaining reliable availability of emergency functionality for legitimate activation requests from trusted contacts and authorized emergency response systems. The multi-layered approach to security verification and fail-safe implementation may provide robust protection against various types of security threats including replay attacks, identity spoofing, cryptographic tampering, and coordinated brute-force attacks, ensuring that the battery reserve feature maintains operational security throughout its deployment and use in emergency scenarios.

Figure 21:
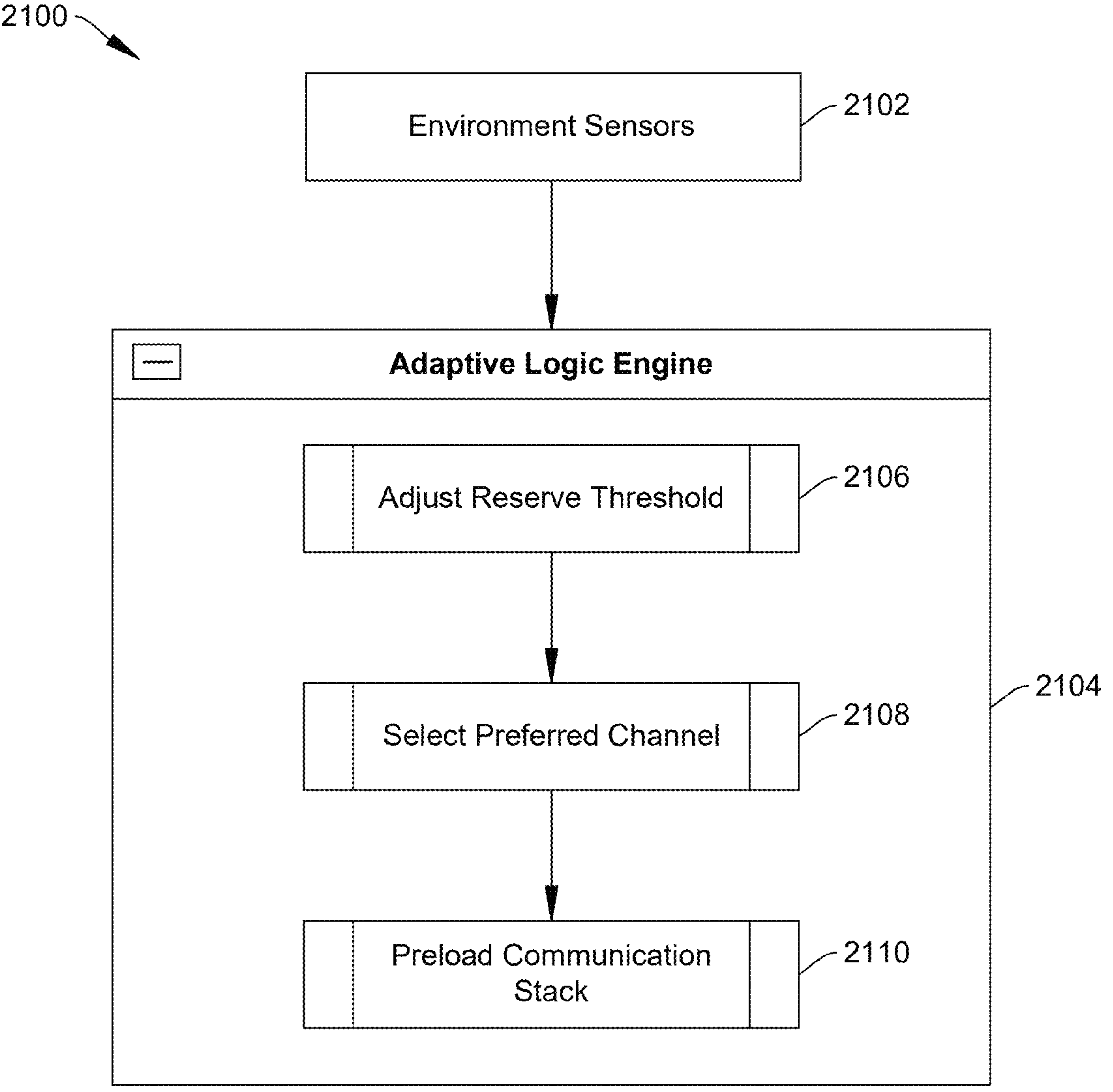
FIG. 21 depicts a system diagram of a device implementing dynamic environmental adjustment capabilities for battery reserve management.

Referring to FIG. 21, a device 2100 demonstrates dynamic environmental adjustment capabilities that enable adaptive management of the battery reserve functionality based on real-time monitoring of external conditions and communication infrastructure availability. The device 2100 may implement intelligent adaptation mechanisms that modify reserve management parameters, communication channel selection, and system readiness based on environmental factors including signal coverage conditions, ambient temperature variations, and motion patterns that may affect battery performance and emergency response requirements.

The device 2100 may include environment sensors 2102 that monitor external conditions to provide real-time environmental data for adaptive system management. The environment sensors 2102 may comprise multiple sensor types including signal strength monitoring capabilities that assess the availability and quality of various communication channels such as cellular coverage, Wi-Fi connectivity, satellite communication links, and local wireless signal strength. The environment sensors 2102 may include temperature monitoring sensors that detect ambient temperature conditions that can affect battery performance characteristics and power consumption requirements, enabling the system to adapt power management strategies based on thermal conditions that influence battery efficiency and capacity utilization.

The environment sensors 2102 may incorporate motion detection capabilities that monitor device movement patterns to assess user activity levels and potential emergency scenarios that may require enhanced emergency preparedness. The motion sensors may detect periods of extended inactivity that might indicate user incapacitation or emergency situations requiring increased emergency response readiness. The environment sensors 2102 may provide continuous or periodic environmental monitoring that enables the system to respond dynamically to changing conditions that affect battery reserve management and emergency communication capabilities.

The environmental monitoring capabilities of the environment sensors 2102 may include GPS-based location tracking that enables assessment of geographical factors affecting communication infrastructure availability and emergency response requirements. The environment sensors 2102 may coordinate with GPS functionality to determine when the device 2100 is located in remote areas where cellular coverage may be limited or unavailable, triggering adaptive responses that modify reserve allocation and communication channel priorities to accommodate reduced communication infrastructure availability. The location-based environmental assessment may enable the system to anticipate communication challenges and adjust emergency preparedness accordingly.

As shown in FIG. 21, the device 2100 may include an adaptive logic engine 2104 that processes the environmental data from the environment sensors 2102 to dynamically adjust system parameters and operational modes based on detected environmental conditions. The adaptive logic engine 2104 may implement intelligent decision-making algorithms that analyze environmental sensor data to determine appropriate system adaptations that optimize battery reserve management and emergency response capabilities for current environmental conditions. The adaptive logic engine 2104 may coordinate multiple system adaptations simultaneously to provide comprehensive environmental responsiveness that enhances the effectiveness of the battery reserve functionality.

The adaptive logic engine 2104 may implement environmental adaptation algorithms that enable satellite readiness mode when satellite connectivity is detected by the environment sensors 2102, ensuring that the communication module 902 maintains appropriate readiness to receive activation signals through satellite communication channels when satellite coverage is available. The satellite readiness mode may involve preloading satellite communication protocols and maintaining enhanced monitoring of satellite communication channels to ensure rapid response to satellite-based activation signals. The adaptive logic engine 2104 may coordinate with the communication module 902 to optimize satellite communication readiness while managing power consumption associated with satellite communication monitoring.

The environmental adaptation capabilities of the adaptive logic engine 2104 may include temperature-based power management that reduces power draw when low temperature conditions are detected by the environment sensors 2102. The adaptive logic engine 2104 may implement temperature compensation algorithms that adjust power consumption patterns and battery reserve allocation based on ambient temperature conditions that affect battery performance characteristics. When low temperature conditions are detected, the adaptive logic engine 2104 may reduce power consumption for non-essential monitoring functions while maintaining emergency functionality readiness, compensating for reduced battery efficiency in cold temperature conditions.

The adaptive logic engine 2104 may implement coverage-based reserve expansion that increases the allocated reserve capacity when cellular coverage limitations are detected by the environment sensors 2102. When the environment sensors 2102 indicate that cellular communication infrastructure is unavailable or degraded, the adaptive logic engine 2104 may expand the reserve capacity allocation to ensure that sufficient battery power remains available for extended emergency communication attempts that may be required when primary communication channels are compromised. The coverage-based adaptation may coordinate with the battery management module 908 to modify the reserve table 1008 and adjust the power setting information VS to accommodate increased emergency communication requirements in areas with limited communication infrastructure.

The adaptive logic engine 2104 may comprise three functional modules that operate in coordinated sequence to implement comprehensive environmental adaptation capabilities. An adjust reserve threshold module 2106 may modify the battery reserve threshold based on environmental conditions detected by the environment sensors 2102, implementing dynamic threshold adjustment that optimizes reserve allocation for current environmental conditions and anticipated emergency response requirements. The adjust reserve threshold module 2106 may analyze environmental sensor data including temperature conditions, location information, and communication infrastructure availability to determine appropriate reserve threshold modifications that ensure adequate emergency power availability while maximizing regular device operational time.

The adjust reserve threshold module 2106 may implement threshold adjustment algorithms that increase the reserve threshold percentage when environmental conditions indicate increased emergency risk or reduced battery efficiency. When the environment sensors 2102 detect low temperature conditions that reduce battery performance, the adjust reserve threshold module 2106 may increase the reserve threshold from a standard allocation such as 20% to an enhanced allocation such as 25% or 30% to compensate for reduced battery efficiency in cold conditions. When location-based assessment indicates that the device 2100 is in a remote area where emergency response may require extended communication duration, the adjust reserve threshold module 2106 may increase the reserve allocation to ensure sufficient power for prolonged emergency operations.

The adaptive logic engine 2104 may include a select preferred channel module 2108 that determines optimal communication channels for emergency operations based on available connectivity options detected by the environment sensors 2102. The select preferred channel module 2108 may evaluate the signal strength and reliability characteristics of various communication channels including cellular networks, Wi-Fi connectivity, satellite communication links, and local wireless connections to identify the most reliable communication pathways for emergency activation and emergency response operations. The select preferred channel module 2108 may implement communication channel prioritization that ranks available channels based on signal quality, reliability characteristics, and power consumption requirements.

The select preferred channel module 2108 may coordinate with the communication module 902 to configure communication channel monitoring and activation readiness based on the prioritized channel selection. When satellite communication links provide the most reliable connectivity based on environmental sensor assessment, the select preferred channel module 2108 may configure the communication module 902 to prioritize satellite communication monitoring and may prepare satellite communication protocols for rapid activation. When cellular coverage provides optimal connectivity, the select preferred channel module 2108 may prioritize cellular communication channels while maintaining backup readiness for alternative communication pathways.

The communication channel selection performed by the select preferred channel module 2108 may implement dynamic channel switching that adapts communication priorities based on changing environmental conditions detected by the environment sensors 2102. As environmental conditions change during device operation, the select preferred channel module 2108 may reassess communication channel availability and may modify communication priorities to maintain optimal emergency communication readiness. The dynamic channel selection may ensure that the emergency communication module 910 maintains access to the most reliable communication pathways available under current environmental conditions.

The adaptive logic engine 2104 may include a preload communication stack module 2110 that prepares communication protocols and resources in advance to ensure rapid activation when emergency mode is triggered. The preload communication stack module 2110 may coordinate with the select preferred channel module 2108 to identify the prioritized communication channels and may initialize the necessary communication protocols, authentication mechanisms, and data structures required for rapid emergency communication activation. The preload communication stack module 2110 may implement protocol preparation that minimizes the latency between emergency activation and the establishment of emergency communications by ensuring that communication resources are ready for immediate use.

The preload communication stack module 2110 may prepare communication protocols for multiple communication channels simultaneously to ensure that backup communication options remain available when primary communication channels become unavailable during emergency operations. The protocol preparation may include initialization of encryption keys for secure communication channels, preparation of authentication data structures for rapid identity verification, and preloading of emergency contact information and message templates that enable immediate emergency communication transmission upon activation. The preload communication stack module 2110 may coordinate with the memory 140 to ensure that prepared communication resources are stored in readily accessible memory locations that enable rapid retrieval during emergency activation.

The communication stack preparation performed by the preload communication stack module 2110 may implement adaptive resource allocation that adjusts the scope of protocol preparation based on available battery capacity and environmental conditions detected by the environment sensors 2102. When battery capacity is abundant and environmental conditions indicate stable communication infrastructure, the preload communication stack module 2110 may prepare comprehensive communication resources for multiple channels and emergency response scenarios. When battery capacity is limited or environmental conditions indicate challenging communication conditions, the preload communication stack module 2110 may focus protocol preparation on the most reliable communication channels identified by the select preferred channel module 2108.

The coordinated operation of the adjust reserve threshold module 2106, the select preferred channel module 2108, and the preload communication stack module 2110 within the adaptive logic engine 2104 may provide comprehensive environmental adaptation that optimizes the battery reserve functionality for current environmental conditions and anticipated emergency response requirements. The sequential coordination between these modules may ensure that reserve threshold adjustments, communication channel selection, and protocol preparation work together to provide optimal emergency preparedness that adapts dynamically to changing environmental conditions detected by the environment sensors 2102.

The environmental adaptation capabilities implemented by the device 2100 may provide enhanced emergency preparedness that responds intelligently to environmental factors that affect battery performance, communication infrastructure availability, and emergency response requirements. The dynamic adjustment of reserve management parameters based on signal coverage, ambient temperature, and motion patterns may ensure that the battery reserve functionality maintains optimal effectiveness across diverse environmental conditions and usage scenarios, maximizing the reliability and effectiveness of emergency communication capabilities when emergency assistance is needed.

While there have been illustrated and described what are considered to be exemplary embodiments of the present disclosure, it will be understood by those skilled in the art and as technology develops that various changes and modifications may be made, and equivalents may be substituted for elements thereof without departing from the true scope of the present disclosure. For example, the present disclosure is applicable to all types of portable electronic devices, including, but not limited to, analog and digital mobile or cellular phones, pagers, wireless portable digital assistants (PDAs), and other portable consumer electronics. More importantly, hardware equivalence may be implemented in lieu of a software-based battery reserve feature for emergency use. Further, many other modifications may be made to adapt the teachings of the present disclosure to a particular situation without departing from the scope of the appended claims.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

I claim:

1. A portable electronic device, comprising:

a battery having a reserve portion masked from normal operation;

a communication module configured to receive a remote activation signal from an external source;

an authentication module configured to verify that the remote activation signal is valid;

a masking module configured to conceal the reserve portion from an operating system until the remote activation signal is authenticated; and an emergency communication module configured to, upon successful authentication of the remote activation signal, unlock the reserve portion and automatically transmit an emergency alert including location data to one or more designated contacts.

2. The device of claim 1, wherein the remote activation signal is received from a satellite communication link.

3. The device of claim 1, wherein the remote activation signal is received via SMS.

4. The device of claim 1, wherein the remote activation signal is received from a cloud-based server request.

5. The device of claim 1, wherein the remote activation signal is received from a local paired device using Bluetooth or Wi-Fi.

6. The device of claim 1, wherein the authentication module verifies the remote activation signal using cryptographic signature validation.

7. The device of claim 6, wherein the authentication module further performs timestamp verification to prevent replay attacks.

8. The device of claim 1, wherein the emergency alert includes GPS coordinates and a predefined emergency message.

9. The device of claim 8, wherein the emergency communication module automatically transmits the emergency alert to multiple designated contacts simultaneously through multiple communication paths.

10. The device of claim 9, wherein the emergency communication module is further configured to transmit a continuous beacon signal until the reserve portion is depleted.

11. A method of providing emergency power and communication in a portable electronic device, comprising:

maintaining a battery reserve portion masked from normal user access and from an operating system of the portable electronic device;

receiving a remote activation signal from an external source through a communication channel;

authenticating the remote activation signal;

unlocking the battery reserve portion upon successful authentication of the remote activation signal; and automatically transmitting an emergency communication including location data to one or more pre-selected contacts using power from the unlocked battery reserve portion.

12. The method of claim 11, wherein the remote activation signal is received via a satellite communication link.

13. The method of claim 11, wherein the remote activation signal is received via SMS, cloud server, or local wireless connection.

14. The method of claim 13, wherein authenticating the remote activation signal further comprises performing cryptographic signature validation and timestamp verification.

15. The method of claim 11, further comprising a step of transmitting a continuous beacon signal using power from the unlocked battery reserve portion until the battery reserve portion is depleted.

16. A portable electronic device, comprising:

a battery management module configured to maintain a battery reserve portion that is masked from an operating system;

a communication module configured to receive a remote activation signal via at least one of a satellite communication link, an encrypted SMS message, a cloud-based server request, or a local wireless connection;

an authentication module configured to validate the remote activation signal using cryptographic verification and timestamp checking; and an emergency communication module configured to, responsive to successful validation of the remote activation signal, access the battery reserve portion and execute emergency operations including transmitting GPS coordinates and activating a beacon signal.

17. The device of claim 16, wherein the authentication module performs identity verification by comparing contact identification information from the remote activation signal against stored authorization data.

18. The device of claim 17, wherein the authentication module further validates message integrity using cryptographic signatures to confirm that the remote activation signal has not been tampered with during transmission.

19. The device of claim 16, wherein the beacon signal adapts transmission frequency and payload content based on remaining battery capacity in the battery reserve portion to maximize operational duration while maintaining detectability by rescue personnel.

20. The device of claim 19, wherein the emergency communication module implements dynamic power management that reduces beacon transmission frequency as the battery reserve portion capacity decreases while maintaining sufficient signal transmission for location tracking throughout an emergency response period.

* * * * *